US012518533B2

(12) United States Patent
Stephen et al.

(10) Patent No.: US 12,518,533 B2
(45) Date of Patent: Jan. 6, 2026

(54) HAZARD DETECTION IN DISPENSING ENVIRONMENTS

(71) Applicant: Wayne Fueling Systems LLC, Austin, TX (US)

(72) Inventors: Aneesh Maria Stephen, Tamil Nadu (IN); Anil Kumar Peddireddy, Lombardi, IL (US)

(73) Assignee: Wayne Fueling Systems LLC, Austin, TX (US)

( * ) Notice: Subject to any disclaimer, the term of this patent is extended or adjusted under 35 U.S.C. 154(b) by 0 days.

(21) Appl. No.: 18/639,055

(22) Filed: Apr. 18, 2024

(65) Prior Publication Data

US 2025/0329163 A1 Oct. 23, 2025

(51) Int. Cl.
*G06V 20/52* (2022.01)
*A62C 37/36* (2006.01)
(Continued)

(52) U.S. Cl.
CPC .............. *G06V 20/44* (2022.01); *A62C 37/04* (2013.01); *G01J 5/48* (2013.01); *G06T 7/11* (2017.01);
(Continued)

(58) Field of Classification Search
CPC .......... G06V 20/44; G06V 20/52; G06T 7/11; A62C 37/04; G01J 5/48; G01J 2005/0077; G08B 25/006
See application file for complete search history.

(56) References Cited

U.S. PATENT DOCUMENTS 6,314,191 B1 * 11/2001 Smith .................... H04R 5/023
381/160
6,367,522 B1 * 4/2002 Tyer ........................ B63B 27/24
114/230.1
(Continued)

FOREIGN PATENT DOCUMENTS

CA         2589186       * 12/2004
WO      2018005616 A1    1/2018
WO   WO-2024139092 A1 *  7/2024 ............ B60W 10/10

OTHER PUBLICATIONS

Wu, Zhikuan translation of WO 2024139092 A1 Jun. 21, 2023 (Year: 2023).*

(Continued)

*Primary Examiner* — Zaihan Jiang
(74) *Attorney, Agent, or Firm* — Mintz, Levin, Cohn, Ferris, Glovsky and Popeo, P.C.

(57) ABSTRACT

A method for detecting and mitigating hazard events within a dispensing environment including a dispenser are provided. The method can include receiving image data of an area within the dispensing environment and determining segmentation frames therein. An initial state of a hazard event within a segmentation frame can be determined based on pixel data within the segmentation frame exceeding a threshold. A persisted state of the hazard event can be determined based on receiving additional image data having a magnified field of view of the area and determining segmentation frames therein. Based on pixel data within the additional image data exceeding the threshold, the method includes generating and providing one or more control signals controlling operation of the dispenser. Related systems, apparatuses, and computer-readable mediums are also provided.

20 Claims, 13 Drawing Sheets

(51) Int. Cl.
  *G01J 5/48* (2022.01)
  *G06T 7/11* (2017.01)
  *G06V 20/40* (2022.01)
  *G08B 25/00* (2006.01)
  *G01J 5/00* (2022.01)

(52) U.S. Cl.
  CPC ........... *G06V 20/52* (2022.01); *G08B 25/006* (2013.01); *G01J 2005/0077* (2013.01)

(56) References Cited

U.S. PATENT DOCUMENTS

| | | | |
|---|---|---|---|
| 10,214,411 B2 | 2/2019 | Fieglein et al. | |
| 10,269,082 B2 | 4/2019 | Morris et al. | |
| 10,577,327 B2 | 3/2020 | Ghumro et al. | |
| 10,726,508 B2 | 7/2020 | Morris et al. | |
| 11,276,051 B2 | 3/2022 | Tang et al. | |
| 11,429,945 B2 | 8/2022 | Fieglein et al. | |
| 11,443,582 B2 | 9/2022 | Derby | |
| 11,599,392 B1* | 3/2023 | Huang | G06V 10/17 |
| 11,810,349 B2 | 11/2023 | Fieglein et al. | |
| 2005/0001722 A1* | 1/2005 | Davis | B67D 7/3218 340/540 |
| 2017/0308965 A1* | 10/2017 | Morris | G06Q 30/0251 |
| 2019/0111767 A1* | 4/2019 | Abdulzahra | B60H 3/0035 |
| 2023/0079388 A1* | 3/2023 | Fisher | G06T 3/60 382/103 |
| 2023/0088414 A1* | 3/2023 | Toni | G06N 20/00 382/103 |
| 2023/0103400 A1 | 4/2023 | Hairston et al. | |
| 2023/0196360 A1 | 6/2023 | Weston et al. | |
| 2024/0078620 A1* | 3/2024 | Morris | B67D 7/04 |
| 2024/0193497 A1* | 6/2024 | Morales Saiki | G06V 40/178 |
| 2024/0212027 A1* | 6/2024 | Woollard | G06V 20/52 |
| 2024/0350099 A1* | 10/2024 | Lane | A61B 5/6892 |

OTHER PUBLICATIONS

International Search Report and Written Opinion received for PCT Patent Application No. PCT/US2024/025124, mailed on Oct. 24, 2024, 15 pages.

* cited by examiner

HAZARD DETECTION IN DISPENSING ENVIRONMENTS

FIELD

The present disclosure relates to hazard detection in dispensing environments and techniques for mitigating detected hazards.

BACKGROUND

A variety of hazards can arise within dispensing environments that can cause damage to property, dispensing equipment, and users or personnel if not detected and resolved quickly. Hazards, such as fire, smoke, sparks, or similar ignition/combustion events, can be particularly problematic in dispensing environments where vehicles and vehicle operators are present to conduct fueling. The combustion of fuel due to such hazards in dispensing environments can cause catastrophic loss of property and human lives. Providing rapid detection of initial hazard events and mitigation of confirmed hazard events can reduce or eliminate the likelihood of hazard events persisting to cause significant damage in dispensing environments.

SUMMARY

In general, devices, systems, and methods for hazard detection and mitigation in dispensing environments are provided.

In one aspect, a method is provided that in one embodiment can include receiving first image data characterizing an area within a dispensing environment comprising a dispenser. The first image data can be acquired via at least one image sensor configured within the dispensing environment. The method can also include determining one or more first segmentation frames in the first image data. The one or more first segmentation frames can include portions of the area. The method can further include determining an initial state of a hazard event within at least one portion of the area based on at least one first pixel in at least one first segmentation frame characterizing the at least one portion of the area exceeding a temperature threshold value associated with the at least one first segmentation frame. The method can also include receiving, responsive to determining the initial state of the hazard event, second image data acquired via the at least one image sensor and characterizing a magnified field of view of the at least one portion of the area. The method can further include determining one or more second segmentation frames in the second image data. The one or more second segmentation frames can correspond to the portions of the area included in the one or more first segmentation frames. The method can also include determining a persisted state of the hazard event within the at least one portion of the area characterized by the magnified field of view based on at least one second pixel in at least one second segmentation frame exceeding the temperature threshold value associated with the at least one pixel in the at least one first segmentation frame for a predetermined period. The method can further include generating, responsive to determining the persisted state of the hazard event, one or more controls signals controlling operation of the dispenser and providing at least one of the generated one or more control signals.

The method can vary in any number of ways. For example, in another embodiment, the at least one image sensor can include a thermometric camera affixed to the dispenser. The thermometric camera can be configured to provide a 360-degree field of view of the area within the dispensing environment. In another embodiment, the hazard event can include at least one of an electrical spark, heat, smoke, a fire, or a dispenser user smoking in proximity of the area within the dispensing environment.

In another embodiment, the method can further include acquiring third image data characterizing an idle condition of the area. The third image data can be acquired via the at least one image sensor prior to the first image data and the second image data. The method can also include determining one or more third segmentation frames in the third image data, the one or more third segmentation frames characterizing the portions of the area. The method can further include determining temperature threshold values for pixels in the one or more third segmentation frames. The initial state of the hazard event can be determined based on comparing temperature values of pixels in the at least one first segmentation frame to temperature threshold values of pixels in at least one third segmentation frame.

In another embodiment, responsive to determining the initial state of the hazard event, the method can also include generating a first control signal causing the at least one image sensor to acquire the second image data at a second frame rate greater than a first frame rate at which the first image data was acquired. The persisted state of the hazard event can be determined based on comparing temperature values of pixels in the at least one second segmentation frame of the second image data to temperature threshold values of pixels in the at least one first segmentation frame of the first image data for the predetermined period.

In another embodiment, generating one or more control signals can include generating a second control signal causing one or more dispensers in the dispensing environment to cease dispensing operations and locking at least one dispenser of the one or more dispensers from dispensing. In another embodiment, generating one or more control signals can include generating a third control signal causing activation of a fire suppression system configured within the dispensing environment to mitigate the hazard event.

In another embodiment, responsive to determining the persisted state of the hazard event, the method can also include generating at least one notification associated with the hazard event. The method can further include providing the at least one notification to emergency services personnel and/or an operator of the dispensing environment.

In yet another aspect, a system is provided that in one embodiment can include at least one image sensor configured to acquire image data characterizing an area within the dispensing environment. The at least one image sensor can be affixed to a dispenser located within the dispensing environment. The system can also include a data processor operably coupled to the at least one image sensor. The system can further include a memory operably coupled to the data processor and storing computer-executable instructions, which when executed by the data processor can cause the data processor to perform operations including receiving first image data characterizing the area within the dispensing environment. The operations can also include determining one or more segmentation frames in the first image data. The one or more segmentation frames can include portions of the area. The operations can also include determining an initial state of a hazard event within at least one portion of the area based on at least one pixel in at least one first segmentation frame characterizing the at least one portion of the area exceeding a temperature threshold value associated with the at least one first segmentation frame. The operations can further include receiving, responsive to determining the initial state of the hazard event, second image data characterizing a magnified field of view of the at least one portion of the area. The operations can also include determining one or more second segmentation frames in the second image data. The one or more second segmentation frames can correspond to the portions of the area included in the one or more first segmentation frames. The operations can further include determining a persisted state of the hazard event within the at least one portion of the area characterized by the magnified field of view based on at least one second pixel in at least one second segmentation frame exceeding the temperature threshold value associated with the at least one pixel in the at least one first segmentation frame for a predetermined period. The operations can also include generating, responsive to determining the persisted state of the hazard event, one or more controls signals controlling operation of the dispenser and providing at least one of the generated one or more control signals.

The system can vary in a number of ways. For example, in some embodiments, the at least one image sensor can include a thermometric camera affixed to the dispenser. The thermometric camera can be configured to provide a 360-degree field of view of the area within the dispensing environment. In another embodiment, the hazard event can include at least one of an electrical spark, heat, smoke, a fire, or a dispenser user smoking in proximity of the area within the dispensing environment.

In another embodiment, the operations can further include acquiring third image data characterizing an idle condition of the area. The third image data can be acquired via the at least one image sensor prior to the first image data and the second image data. The operations can also include determining one or more third segmentation frames in the third image data, the one or more third segmentation frames characterizing the portions of the area. The operations can further include determining temperature threshold values for pixels in the one or more third segmentation frames. The initial state of the hazard event can be determined based on comparing temperature values of pixels in the at least one first segmentation frame to temperature threshold values of pixels in at least one third segmentation frame.

In another embodiment, responsive to determining the initial state of the hazard event, the operations can also include generating a first control signal causing the at least one image sensor to acquire the second image data at a second frame rate greater than a first frame rate at which the first image data was acquired. The persisted state of the hazard event can be determined based on comparing temperature values of pixels in the at least one second segmentation frame of the second image data to temperature threshold values of pixels in the at least one first segmentation frame of the first image data for the predetermined period.

In another embodiment, generating one or more control signals can include generating a second control signal causing one or more dispensers in the dispensing environment to cease dispensing operations and locking at least one dispenser of the one or more dispensers from dispensing. In another embodiment, generating one or more control signals can include generating a third control signal causing activation of a fire suppression system configured within the dispensing environment to mitigate the hazard event.

In another embodiment, responsive to determining the persisted state of the hazard event, the operations can also include generating at least one notification associated with the hazard event. The operations can further include providing the at least one notification to emergency services personnel and/or an operator of the dispensing environment.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION

Figure 1:
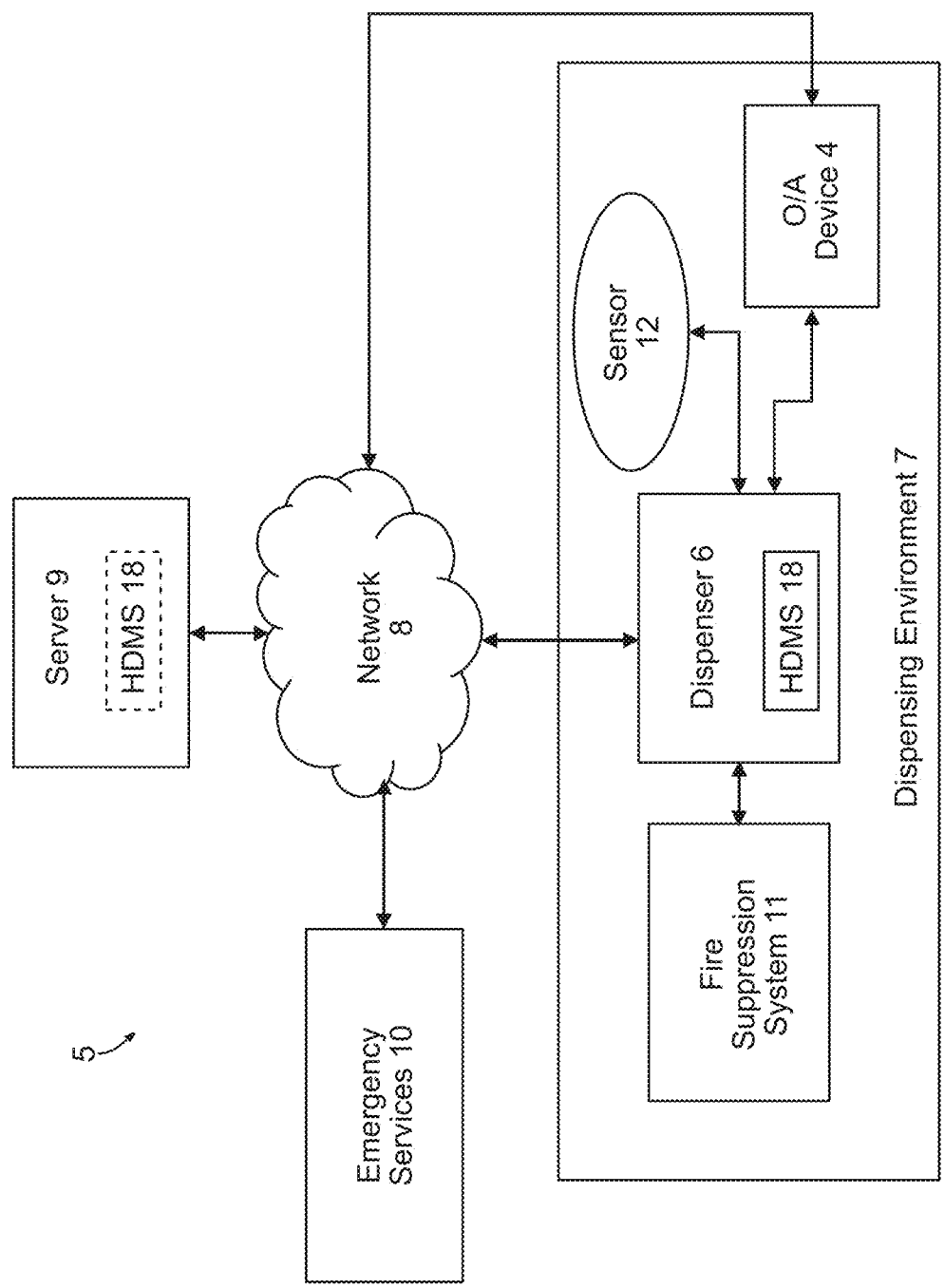
FIG. 1 is a system block diagram illustrating one embodiment of a dispensing system configured to detect and mitigate hazards within a dispensing environment.

Certain exemplary embodiments will now be described to provide an overall understanding of the principles of the structure, function, manufacture, and use of the devices, systems, and methods disclosed herein. One or more examples of these embodiments are illustrated in the accompanying drawings.

Dispensing environments where dispensed products, such as liquid, gaseous fuel, or electricity, are dispensed can be hazardous due to the flammable, combustible nature of the dispensed products. A variety of hazardous conditions can exist when dispensing these products that can include but are not limited to smoke, fire, electrocution, shock, or the like. For example, there is a high likelihood of a fire erupting when a vehicle operator fuels their vehicle while smoking a combustible material. Initial hazards, such as a vehicle operator's lit cigarette, can become more significant and persistent hazards within the dispensing environment, if for example, the dispenser nozzle is left in the vehicle and fuel is flowing. Combustion of the flowing fuel can cause significant injury and even fatality for the vehicle operator, as well as significant physical damage to the vehicle, dispenser, and structures in proximity of the dispenser or dispenser environment. Thus, rapidly detecting hazard events is critical to limit the damage that can be caused due to hazardous events within dispensing environments.

Additionally, once hazards are detected, existing mitigation techniques can be limited to manual operations which may be inadequate to prevent an initial hazard from becoming a persisted hazard that can grow in scale beyond the capabilities of manual mitigation. For example, an undetected spark due to faulty wiring or a lit cigarette within the dispensing environment can quickly ignite fuel vapors and combust flowing fuel to produce a significantly sized fire that attendees or operators of the dispensing environment are unable to handle themselves and can require additional support from a local or regional fire department or emergency services. Reducing the time between initial detection of a hazard event and applying mitigation measures can be key to reducing injury and damage that can be caused by persisted hazards, such as undetected fires or related combustion events within dispensing environments.

Existing mitigation techniques in dispensing environments are limited to manual detection and mitigation control of dispenser operations. Current dispensing environments lack the ability to autonomously monitor the dispensing environment for hazards and perform mitigation measures, such as notifying a fire department or other emergency services. Additionally, current dispensing environments are not configured to automatically control dispensing operations of the dispensers in response to detected hazards and instead rely on manual intervention to stop the flow of fuel through dispensers during hazard events.

The system and methods herein can address the foregoing shortcomings of existing hazard mitigation system and techniques and reduce the likelihood that initial hazard events can expand into larger, more dangerous hazard events. Broadly, the system and methods herein can utilize image data of the dispensing environment to detect an initial hazard event that can occur within an area of the dispensing environment based on thermal signature of pixels within the image data. Once confirmed, additional image data can be collected corresponding to a magnified view of the area in which the initial hazard event was located and based on a rate of change of the thermal signature of pixels within the image data, control signals can be generated to mitigate the hazard event. The control signals can include providing an alert or notification to an attendee of the dispensing environment, a fire department, and/or emergency services personnel. The control signals can also be configured to control operation of the dispensers. For example, responsive to determining a persisted state of the hazard event, control signals can be generated to reduce or otherwise discontinue flow of fuel from or within the dispensers. The control signals can also cause the dispensers to lock or cease operation until an attendee or operator of the dispensing environment unlocks the dispensers for use.

Advantageously, the system and methods herein can provide automated monitoring and hazard mitigation techniques that can enable dispensing environment operators to protect dispensing environments, users, and the equipment located therein from fire or combustion related hazard events. The automated solution provided herein requires no manual intervention and can operate autonomously within the dispensing environment to generate alerts and notification to attendees or operators of the dispensing environment, as well as fire department or emergency services personnel in response to detected hazards. The system and methods herein can be configured to autonomously control operations of dispensers in the dispensing environment and can reduce further risk of injury or damage by reducing or terminating product dispensing at dispensers. Additionally, the image data collected before, during, and after hazards events can be stored and used for audit or review purposes.

FIG. 1 illustrates a block diagram of a system 5 configured to detect and mitigate hazard events within a dispensing environment. One or more dispensers 6 configured to dispense products, such as a liquid fuel, electricity, or a gaseous fuel, can be arranged in a dispensing environment, such as a fueling location or a gas station. Vehicles and vehicle operators can enter the dispensing environment 7 and conduct dispensing operations to receive dispensed products from the dispenser 6. In some embodiments, the dispenser 6 can include a computing device configured therein, as described later, to perform the hazard detection and mitigation techniques and methods described herein. The system 5 can also include an operator or attendee device 4 (O/A device 4), such as a computing device or monitoring terminal used by the operator or attendee of the dispensing environment 7 and configured to receive notifications or alerts from the system 5 and/or to generate one or more control signals controlling operation of the dispensing environment 7.

One or more sensors 12 can be configured within the dispensing environment 7. For example, in one embodiment, a sensor 12 can be affixed to the dispenser 6, such as atop the dispenser 6. In some embodiments, one or more of the sensors 12 can be additionally, or alternatively, positioned within the dispensing environment, such as on a canopy within the dispensing environment 7 covering the dispenser 6. The sensors 12 can be configured in a location that can provide a field of view of an area within the dispensing environment 7. In some embodiments, the sensor 12 can be capable of providing a 360-degree field of view of the dispensing environment 7 and/or the area 13. In some embodiments, the sensor 12 can be an image sensor, such as a thermometric camera. The sensor 12 can be configured to acquire image data at multiple frame rates and at one or more magnification settings. When configured as a thermometric camera, the sensor 12 can generate image data including pixels having an intensity or brightness that can correspond to a measure of heat present at a location in the dispensing area 7 that is associated with the pixel.

Image data acquired by the sensor 12 can be provided to a server 9 via a network 8. The network 8 can include, for example, any one or more of a personal area network (PAN), a local area network (LAN), a campus area network (CAN), a metropolitan area network (MAN), a wide area network (WAN), a broadband network (BBN), a virtual private network (VPN), the Internet, or the like. Further, the network 8 can include, but is not limited to, any one or more of the following network topologies, including a bus network, a star network, a ring network, a mesh network, a star-bus network, tree, hierarchical network, or the like.

The server 9 can be configured with at least one processor operably coupled to the network 8 and to a non-transitory storage device, or memory, storing computer-readable and executable instructions. The processor and the memory can form at least one computing system of the server 9 within which a hazard detection and mitigation subsystem (HDMS) 18 can be configured. The HDMS 18 is a data processing system configured to evaluate acquired image data with respect to pre-configured temperature threshold data for detecting hazards within a dispensing environment and to generate mitigation techniques to remove or reduce the hazard. In some embodiments, the HDMS 18 can be configured within a computing device of the dispenser 6 as further shown in dashed lines in FIG. 1. The HDMS 18 is described in detail with reference to FIG. 5 below.

The HDMS 18 can receive image data from the sensor 12 and can detect states of a hazard present within the dispensing environment 7 and can generate alerts and control signals based on the detected state of the hazard. For example, responsive to detecting an initial state of a hazard event, such as a fire, sparks, or the like the HDMS 18 can generate a control signal causing the sensor 12 to acquire image data at an increased frame rate and including a magnified view of a location within the dispensing environment 7 where the hazard event is present. In some embodiments, the HDMS 18 can generate a control signal causing the dispenser 6 to cease dispensing in response to detected hazard events. In some embodiments, the HDMS 18 can generate an alert or notification to emergency services 10, such as an ambulance or fire department, responsive to detecting a hazard event. In other embodiments, the HDMS 18 can generate a control signal causing a fire suppression system 11 configured in the dispensing environment 7 to activate and provide suppressive materials to extinguish the hazard or fire detected within the dispensing environment 7. The fire suppression system 11 is an electro-mechanical system configured to detect, control, and extinguish fires within the dispensing environment 7. The fire suppression system 11 can include components configured for hazard detection, actuation and delivery of hazard mitigation materials, fire prevention agents, or fire extinguishing agents. Detection can be accomplished by mechanical or electrical components. Mechanical detection can utilize fusible-link or thermo-bulb detectors configured within the dispensing environment 7 in proximity of the dispensers 6. These detectors can be designed to separate at a specific temperature and release tension on a release mechanism. Electrical detection can utilize heat detectors equipped with self-restoring, contacts that are normally open and can close when a predetermined temperature is reached. The fire suppression system 11 can be configured for remote or on-premise automated operation (e.g., via control signals received by the fire suppression system 11 from the HDMS 18 or the O/A device 4) as well as on-premise manual operation. Actuation can involve a pressurized fluid and a release valve, or in some cases an electric pump. Delivery is accomplished by means of piping and nozzles configured within the dispensing environment 7. Nozzle design can be specific to the agent used and coverage desired for one or more locations or dispensers 6 arranged within the dispensing environment 7.

In some embodiments, the HDMS 18 can be configured to detect additional states of the hazard 17. For example, in some embodiments, the HDMS 18 can determine a spreading state in which the hazard 17 is becoming larger or is traveling from a first location, such as a location within frame 14-1, to a second location, such as a location within frame 14-2. In some embodiments, the spreading state can correspond to the hazard 17 spreading within an area associated with a frame 14. For example, in some embodiments, the spreading state can correspond to the hazard 17 progressively growing in intensity, location, or size (e.g., area, height, width). In some embodiments, the HDMS 18 can be configured to detect a diminishing state in which the hazard 17 is lessening in intensity, location, or size (e.g., area, height, width). In some embodiments, the HDMS 18 can detect a primed state in which an accelerant, such as fuel dispensed from a dispenser 6, has been spilt within the area 13 and may combust upon the introduction of a hazard 17. In some embodiments, the HDMS 18 can determine a critical zone of the hazard 17. The critical zone can be associated with a distance between the hazard 17 and a location at which flammable items may be kept, stored, or are otherwise located within the dispensing environment 7. Based on the location of the hazard 17 determined within one or more frames 14, the critical zone can be determined to extend between the hazard 17 and the location of the flammable items as determined within the one or more frames 14. The critical zone can characterize a risk level associated with the hazard 17 progressing or spreading toward the flammable items, where once contacted, the hazard 17 may ignite the flammable items and cause catastrophic losses within the dispensing environment 7 if left unmitigated.

Figure 2:
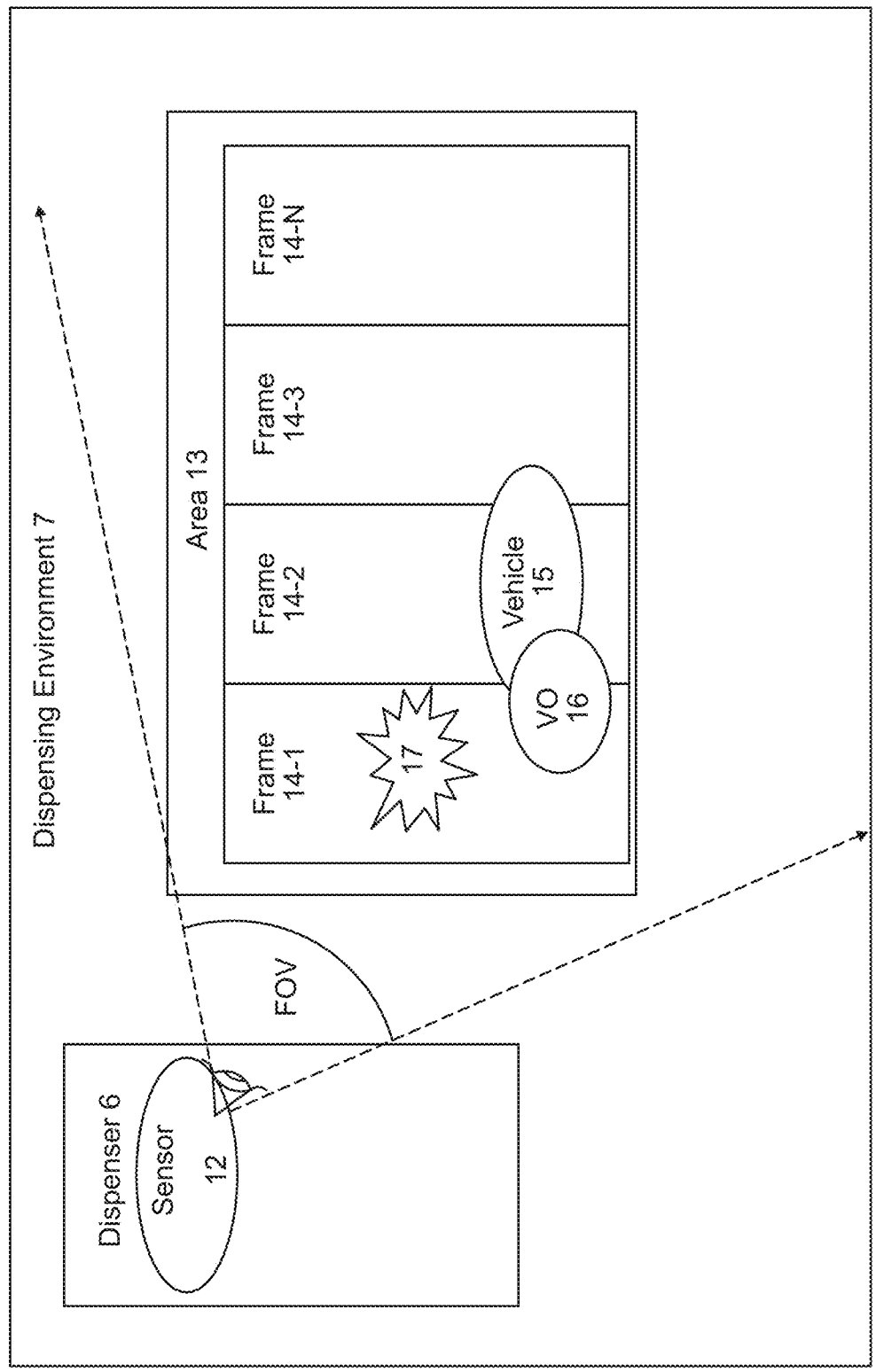
FIG. 2 is a system block diagram of a dispenser configured within the dispensing environment of FIG. 1.

As shown in FIG. 2, the sensor 12 can be affixed to the dispenser 6 and can have a field of view (shown as the arc "FOV" extending from the eye icon and between the two dashed lines in FIG. 2) including an area 13 within the dispensing environment 7 (and thus a field of view including a vehicle 15, a vehicle operator (VO) 16, and a hazard 17 that can be present within the area 13). In some embodiments, the sensor 12 can be affixed to a top surface or to a front surface of the dispenser 6 so as to have a broad field of view of the area 13 within the dispensing environment 7. In some embodiments, the sensor 12 can be affixed to an awning that covers the dispenser 6, such that the sensor 12 provides a top-down view of the area 13. It can be understood that a field of view (FOV) of the sensor 12 can include an area associated with a maximum area of the dispensing environment 7 that the sensor 12 can acquire image data for based on the focal length of a lens of the sensor 12 and a size of the sensor 12, which can be a function of a size and a number of imaging pixels configured within the sensor 12.

Upon acquiring image data via the sensor 12, the HDMS 18 can determine one or more segmentation frames 14 of the area 13. For example, the area 13 can include a plurality of segmentation frames 14, such as frames 14-1, 14-2, 14-3 . . . 14-N. Although 4 frames are shown in FIG. 2, the HDMS 18 can be configured to generate more or less than 4 frames for the area 13. For example, the HDMS 18 can be configured to generate 1, 2, 3, 4, 5, 10, 15, 20, 25, 30, 35, 40, 45, or 50 frames 14 of the area 13. The segmentation frames can be generated by the HDMS 18 based on assigning a coordinate data system to pixels in the image data delineating the frames 14. In this way, the frames 14 and their contents can correspond to physically demarcated areas within the area 13 of the dispensing environment 7. Although in FIG. 2, the frames 14 are depicted adjacent to the dispenser 6, the HDMS 18 can generate frames for a variety of areas in the dispensing environment 7 that include the dispenser 6, the vehicle 15, VO 16, as well as structures or equipment which can also be configured within the dispensing environment 7, such as fire suppression system 11, a retail facility, or a maintenance or service facility. The number of frames 14 can be determined by the HDMS 18 based on a user-provided frame dimension metric. If a distance or a length of the area 13 to be covered by a frame 14 is more than the user-provided frame dimension metric, then the HDMS 18 can increase the number of frames to cover the distance or length of the area 13. In some embodiments, the frame dimension metric can be configured such that 1 frame can be used to cover 1.5 to 2 meters, although greater or lesser values of the frame dimension metric can be envisioned.

Figure 3:
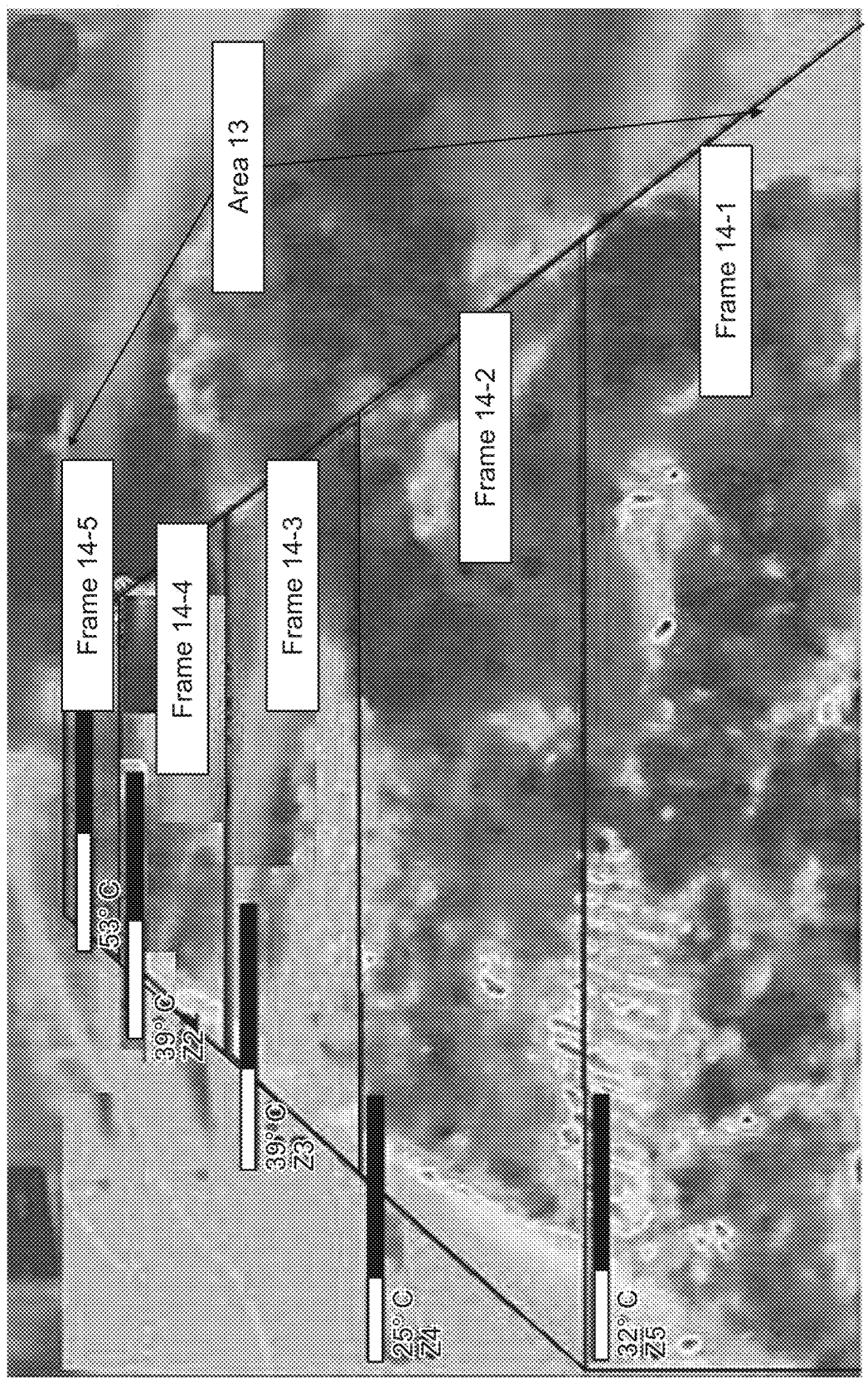
FIG. 3 depicts an exemplary embodiment of image data associated with the dispensing environment of FIGS. 1 and 2 during idle conditions.
Figure 4:
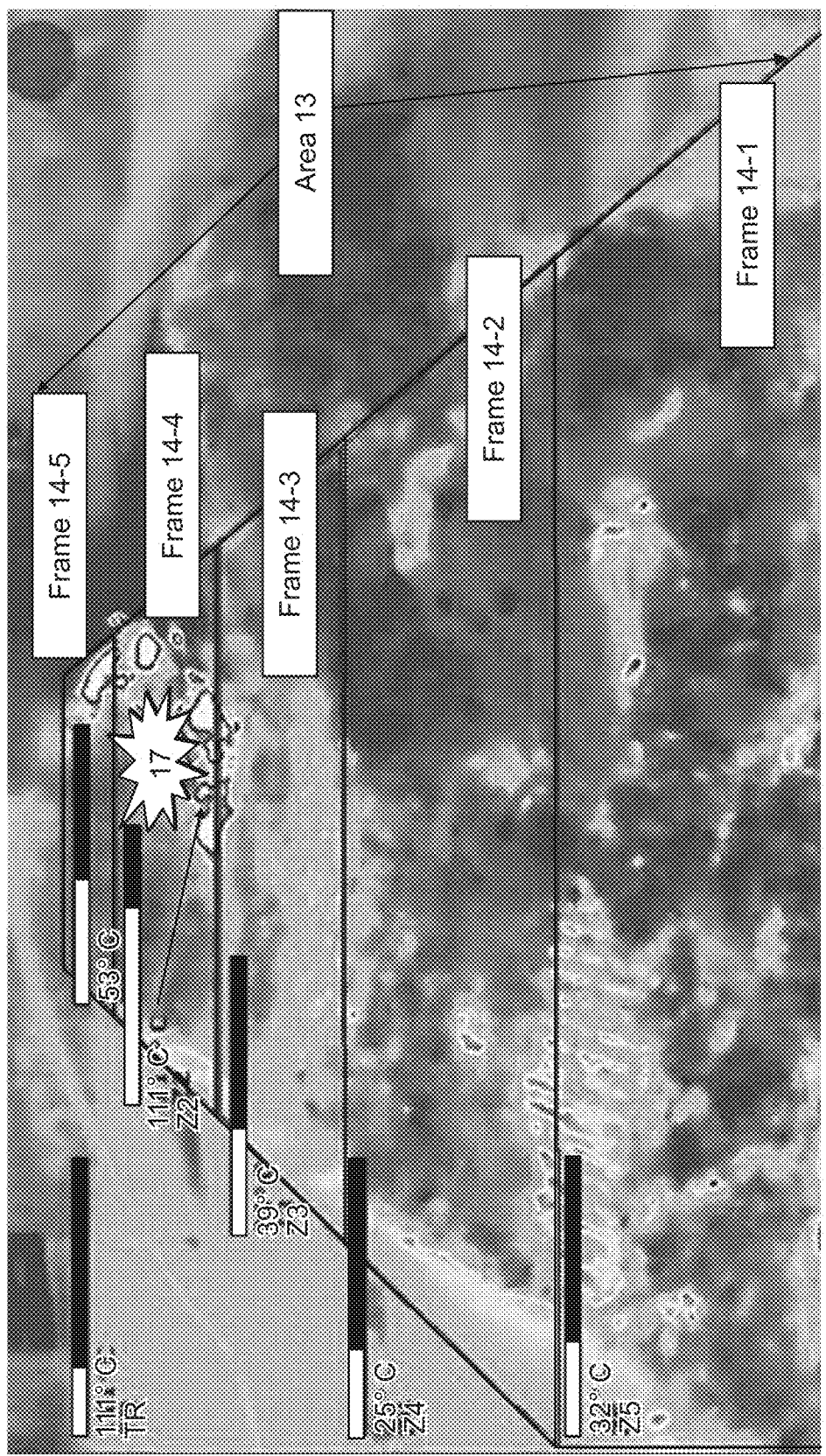
FIG. 4 depicts an exemplary embodiment of image data associated with the dispensing environment of FIGS. 1 and 2 during hazard conditions.

FIGS. 3 and 4 are thermal images showing frames 14 delineating area 13 of the dispensing environment 7 as determined by the HDMS 18 based on the image data acquired via sensor 12. As shown in FIG. 3, initial image data acquired during an idle period in which no hazards 17 are present can be processed by the HDMS 18 and a temperature can be assigned to each frame 14. For example, frame 14-1 can be assigned a temperature of 32 degrees C., frame 14-2 can be assigned a temperature of 25 degrees C., and frames 14-3 and 14-4 can be assigned a temperature of 39 degrees C. The assigned temperature of each frame 14 can be determined based on an average of the temperature value assigned to each pixel within the frame 14. As each pixel has an intensity value corresponding to a thermal signature, or a temperature value, present at a location associated within the pixel. Thus, averaging the temperature values within a frame can determine the assigned temperature for each frame.

The temperature values associated with each frame 14 that are determined during an idle period can be utilized as threshold temperature values by the HDMS 18 when evaluating subsequently processed image data for hazard detection. In this way, the threshold temperature values determined during an idle period free of any hazards within the area 13 can be a baseline used for comparison of image data in which a hazard can be present within the area 13. Additionally, minimum and maximum temperature threshold values can also be determined for each frame 14 based on image data collected during idle periods at different times of day and during different climatic conditions (e.g., conditions such as rain, sun, cloudy weather, or the like).

As shown in FIG. 4, the image data of the area 13 has been acquired via the sensor 12 when a hazard 17 is present within the area. For example, the hazard 17 has been determined in frames 14-4 where the temperature values are determined to be 111 degrees C. Based on determining the temperature values of frame 14-4 exceed the temperature threshold value of 39 degrees C. determined for frame 14-4 during the idle conditions shown in FIG. 3, the HDMS 18 can determine that the hazard 17 is present during active monitoring conditions in a location of area 13 corresponding to frame 14-4 and can take further actions, such as generating one or more of an alert or control signal to mitigate the hazard.

In some embodiments, the HDMS 18 can determine multiple hazards 17 within the area 13. For example, responsive to determining a first hazard 17 within a first frame and a second hazard 17 within a second frame, the HDMS 18 can be configured to prioritize generation of control signals and/or alerts based on a magnitude by which the temperature values exceed the temperature threshold values associated with the first and second frames 14. Thus, if temperature values determined for the first hazard 17 exceed the temperature threshold values for the first frame by 50 degrees, and the temperature values determined for the second hazard 17 exceed the temperature threshold values for the second frame by 25 degrees, the HDMS 18 would prioritize generation of control signals and/or alerts for the first hazard higher than those generated for the second hazard. This can be advantageous to help an operator of the dispensing environment 7 or fire/emergency services personnel isolate and mitigate a higher priority hazard 17 over a lower priority hazard 17.

In some embodiments, the image data of the area 13 can be color image date, grayscale image data, black and white image data, or the like. One skilled in the art will appreciate that regardless of the color modality of the image data, the HDMS 18 can be configured to detect hazards 17 based on intensity values of individual pixels in the image data. The intensity values of the individual pixels at particular locations within the frames 14 can correspond to temperature values at those same particular locations within the frames 14. A range of intensity values of the pixels can correspond to a range of temperature values at the locations identified by the pixels. For example, in frame 14-4 of FIG. 4, the temperature determined to be 111 degrees Celsius can correspond to intensity values of one or more pixels at the location at which hazard 17 is present, denoted by the arrow identifying the location in the frame 14 at which the intensity values correspond to the determined temperature of 111 degrees Celsius.

Figure 5:
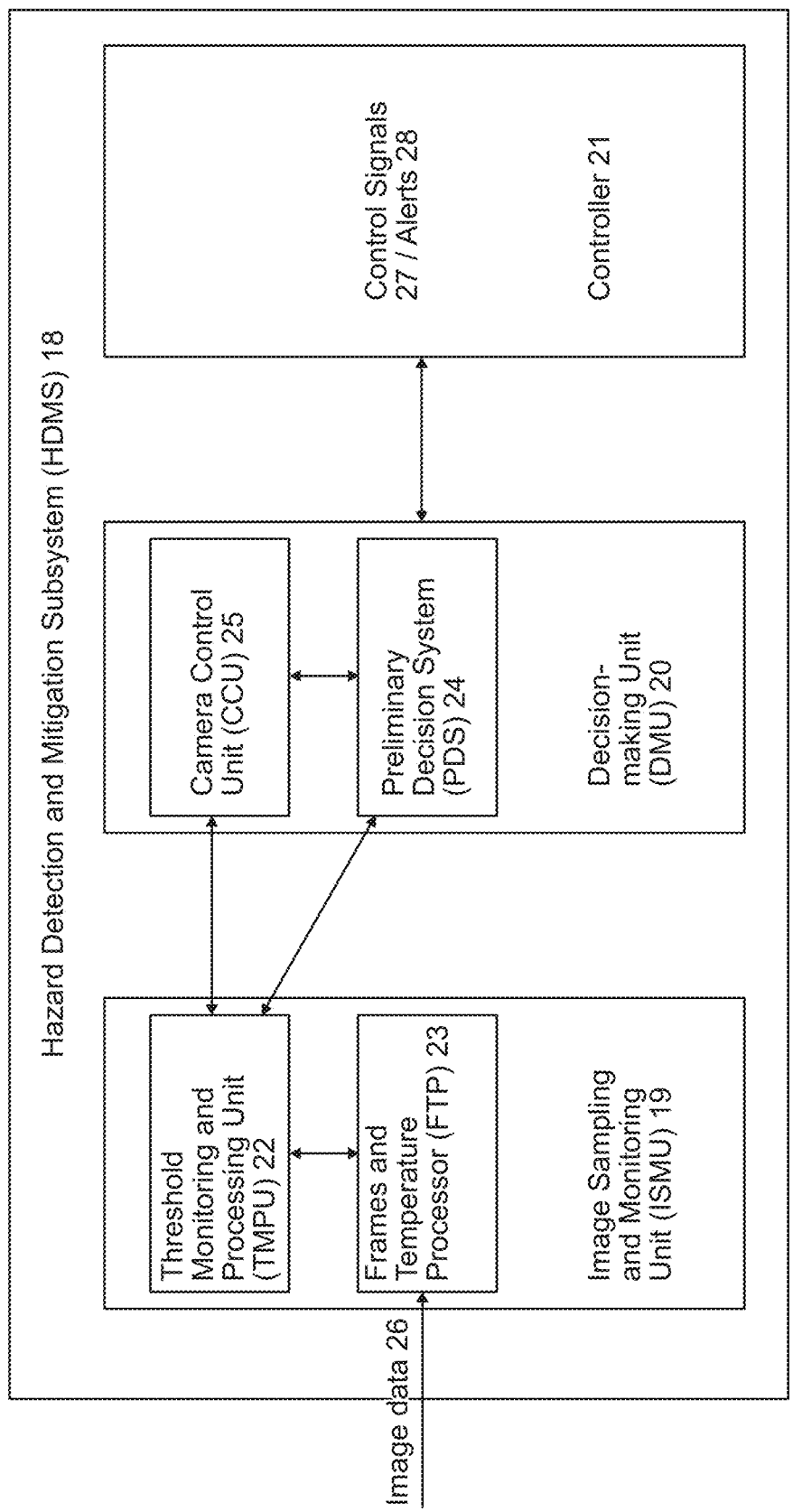
FIG. 5 is a system block diagram of a hazard detection and mitigation system configured within the dispensing system of FIG. 1.

The HDMS 18 can include a number of software modules that include computer-readable and executable program code which implement a hazard detection and mitigation algorithm configured to process image data received from sensor 12, determine hazards within segmentation frames 14, and generate outputs such as alerts, notifications, or control signals to mitigate the determined hazard. For example, as shown in FIG. 5, the HDMS 18 can include an image sampling and monitoring unit (ISMU) 19, a decision-making unit (DMU) 20, and a controller 21. The ISMU 19 can receive image data 26 acquired via the sensor 12 and can determine one or more segmentation frames 14 associated with an area 13 included in the image data 26 using the Frames and Temperature Processor (FTP) 23. The FTP 23 can utilize image segmentation techniques to partition the image data 26 into one or more frames 14. The FTP 23 can further determine temperature values and temperature threshold values for each frame 14. The FTP 23 can evaluate the temperature values with respect to the temperature threshold values which can be pre-configured. If the determined temperature values are within a pre-defined range associated with the temperature threshold value, the image data can be discarded for more efficient processing and use of computing resources. In this way, if the temperature values of the acquired image data 26 do not exceed the threshold temperature values, the TMPU 22 determines that no hazard event is present within the frame 14. The ISMU 19 can continue to receive and process the image data 26 in a monitoring state.

If the determined temperature values exceed the pre-defined range associated with the temperature threshold values, the FTP 23 can proceed to annotate the determined temperature values associated with one or more frames 14. Annotated image data, which can include the determined temperature values and/or the determined temperature threshold values can be provided to the threshold monitoring and processing unit (TMPU) 22. The TMPU 22 can continuously evaluating the annotated image data to determine if temperature values within one or more frames 14 continue to exceed the determined temperature threshold values.

Once an initial hazard 17 has been detected, the DMU 20 can confirm a persisted state of the hazard 17. For example, if the temperature values of the image data 26 exceed the temperature threshold values, the TMPU 22 can exchange data with a preliminary decision system (PDS) 24 and the camera control unit (CCU) 25 that can be configured within the DMU 20. For example, if the TMPU 22 determines the temperature values within a frame 14 corresponding to a portion of area 13 are above the determined temperature threshold values, the TMPU 22 can provide data and/or instructions to the CCU 25 to cause the sensor 12 to zoom in (or out) on the hazard 17 that is present in a particular frame 14 and further acquire magnified image data of the hazard 17 within the particular frame 14 and/or surrounding or adjacent frames 14. In this way, the CCU 25 can acquire magnified image data of a location of the area 13 corresponding to the frame 14 in which the hazard 17 was detected (e.g., the location where the temperature values exceeded the temperature threshold values). In some embodiments, the TMPU 22 can generate a control signal to cause the CCU 25 to adjust a frame rate setting of the sensor 12, such that the frame rate at which the sensor 12 acquires image data 26 is increased compared to the originally received image data 26. In some embodiments, the TMPU 22 can generate a control signal causing the CCU 25 to acquire image data 26 at a reduced frame rate compared to the originally received image data. In this way, slow motion image data of the hazard 17 and or area 13 can be acquired.

Responsive to operations of the CCU 25 (and the confirmed occurrence of the hazard 17 within one or more frames 14), the PDS 24 can cause the controller 21 to generate control signals 27 and/or alerts 28. In some embodiments, the controller 21 can generate control signals 27 configured to cause a forecourt controller (such as controller 121 described in relation to FIG. 9 and associated with operating the dispenser 6) to generate control signals causing the dispenser 6 to cease or discontinue dispensing operations and lock the pumps 108 from operation. In some embodiments, the control signals 27 can be configured to generate an alert 28 to emergency response services 10, such as a fire department or ambulance service. In some embodiments, the control signals 27 can be configured to control operation of a fire suppression system 11 that can be configured within the dispensing environment 7.

Figure 6A:
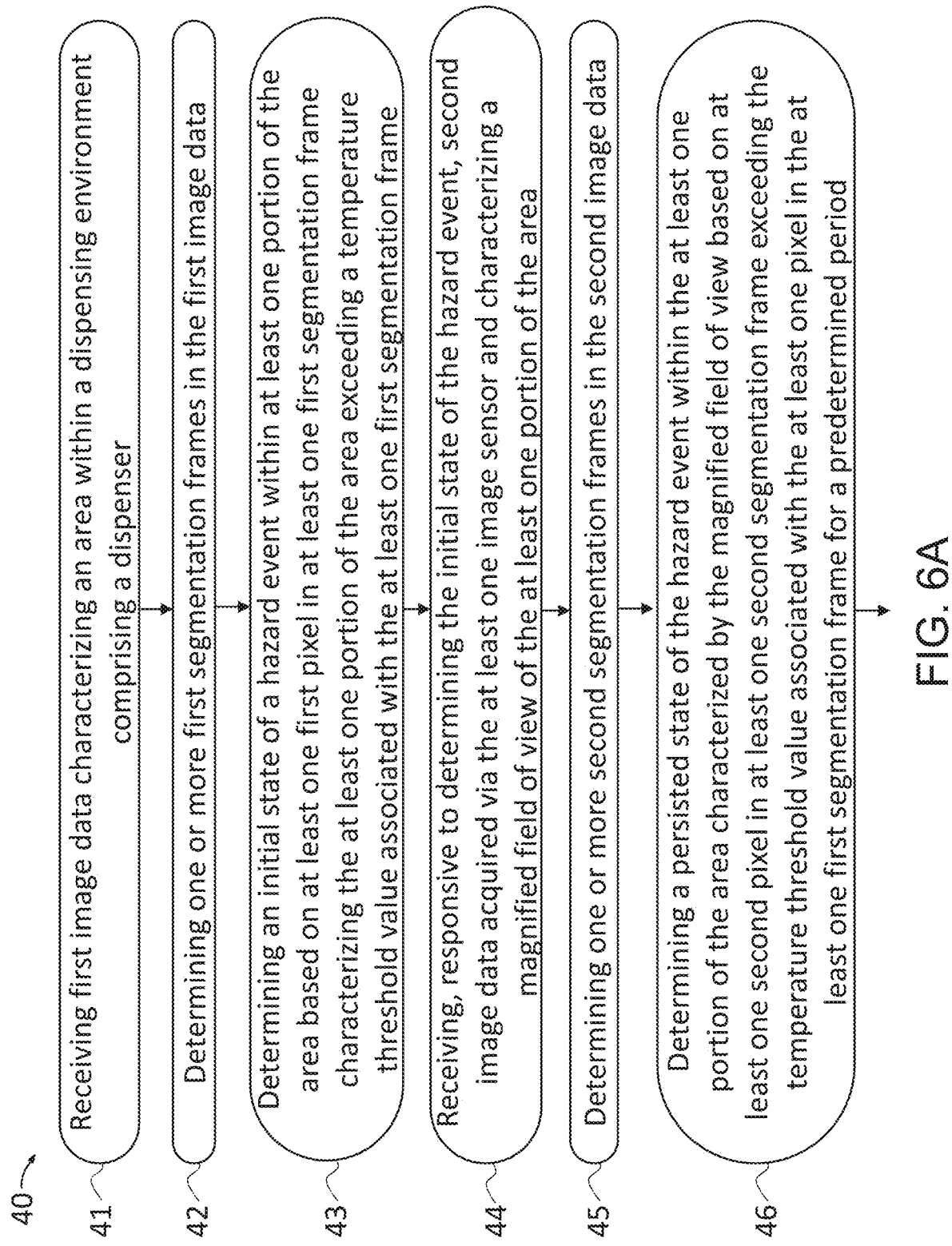
FIGS. 6A and 6B are process diagrams of an exemplary embodiment of a method for detecting and mitigating hazards within the dispensing system of FIG. 1.
Figure 6B:
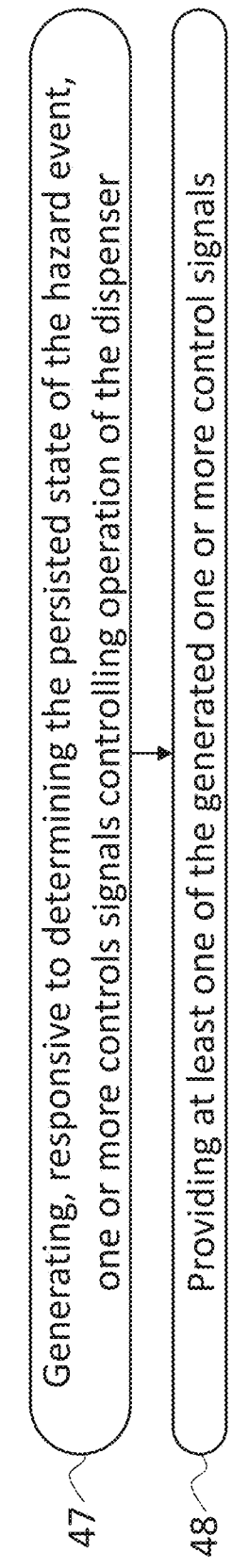
Figure 7:
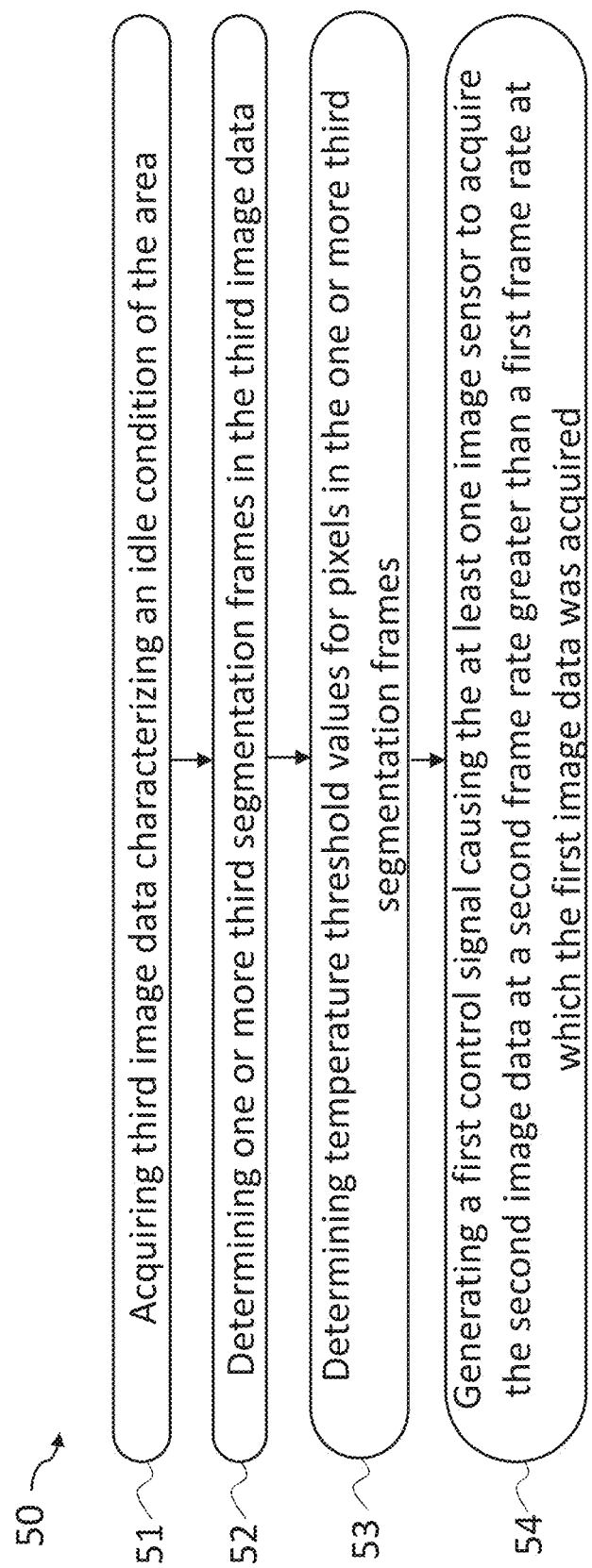
FIG. 7 is a process diagram of an exemplary embodiment of a method for generating control signals controlling components of the dispensing system of FIG. 1 to mitigate detected hazards.

FIGS. 6A, 6B, and 7 include exemplary embodiments of methods performed by the system 5 of FIGS. 1 and 2 to detect and mitigate hazards within dispensing environments. In some embodiments, the methods described in relation to FIGS. 6A, 6B, and 7 can be performed by a computing device that is remotely located from the dispensing environment 7, such as by the HDMS 18 configured on the server 9. In other embodiments, the methods described in relation to FIGS. 6A, 6B, and 7 can be performed by a computing device that is configured within the dispensing environment 7, such as by the HDMS 18 configured on a computing device within the dispenser 6. In some embodiments, a first portion of the methods described in relation to FIGS. 6A, 6B, and 7 can be performed by the server 9 and a second portion of the methods described in relation to FIGS. 6A, 6B, and 7 can be performed by the computing device configured within the dispenser 6.

As shown in FIG. 6A, the method 40 can include at 41 receiving first image data characterizing an area 13 within a dispensing environment 7 comprising a dispenser 6. The first image data can be acquired via at least one image sensor 12 configured within the dispensing environment 7. For example, the image data can be acquired via a thermometric camera 12 and can include pixels, whose values correspond to temperature values at various locations within the area 13. The image data can include time-series video data comprising a field of view of the area 13 within the dispensing environment 7. In some embodiments, the first image data can be acquired at a first frame rate of about 1 frame every 3-5 seconds. Additional or alternate first frame rates can be envisioned.

In some embodiments, the image data can be received in real-time, such as during an active monitoring condition in which the image data is continuously acquired and processed in real-time or near real-time. In some embodiments, the image data can be previously acquired and can processed after acquisition, such as during a calibration period associated with an idle condition or state of the area 13 in which no hazards 17 are present. Image data acquired during the idle condition can be used to determine temperature threshold values that can be compared to acquired image data during monitoring conditions to determine the presence of hazards 17 within the area 13.

At 42, the method 40 can include determining one or more first segmentation frames 14 in the first image data. The one or more first segmentation frames 14 can include portions of the area 13. For example, the frames 14 can include frames 14-1, 14-2, 14-3 and the like that can correspond to locations or portions of the area 13. The segmentation frames 14 can be determined by assigning a common coordinate system to pixels in the image data that correspond to real-world physical locations or portions of the area 13. Based on the assigned coordinate values, segmentation analysis can be performed on the image data to determine the segmentation frames 14.

At 43, the method 40 can further include determining an initial state of a hazard event 17 within at least one portion of the area 13 based on at least one first pixel in at least one first segmentation frame 14 characterizing the at least one portion of the area exceeding a temperature threshold value associated with the at least one first segmentation frame 14. The initial state of the hazard event 17 can include an initial spark, an initial combustion event, a lightning strike, an unextinguished cigarette, a dispenser 6 that has caught fire, an ungrounded arcing wire emitting sparks, or the like which can introduce a hazard 17 within the area 13 and potentially lead to a more persistent state of the hazard 17 if unmitigated.

By performing frame-based comparison of temperature values in the image data to temperature threshold values determined for the same portions of the area 13 defined by the frames 14, the initial state of the hazard event can be determined. The temperature threshold values can be determined during an idle condition of the dispensing environment 7. For example, as described in relation to FIG. 7, the method 50 at 51 can include acquiring third image data characterizing an idle condition of the area 13. The third image data can be acquired via the at least one image sensor 12 prior to the first image data and the second image data, and this is acquired prior to a hazard event or during a period in which no hazards are present within the area 13. At 52, the method 50 can also include determining one or more third segmentation frames 14 in the third image data. The one or more third segmentation frames 14 can characterize the portions of the area 14. At 53, the method 50 can further include determining temperature threshold values for pixels in the one or more third segmentation frames 14. In this way, the initial state of the hazard event 17 can be determined based on comparing temperature values of pixels in the at least one first segmentation frame to temperature threshold values of pixels in at least one third segmentation frame determined under idle conditions of the area 13.

Returning to FIG. 6A, at 44, the method 40 can include receiving second image data acquired via the at least one image sensor 12 responsive to determining the initial state of the hazard event. The second image data can characterize a magnified field of view of the at least one portion of the area 13. For example, responsive to determining the initial state of the hazard event 17, the system 5 can be configured to cause the sensor 12 to pan, zoom, and/or focus its field of view to a location within the area 13 at which the initial state of the hazard event 17 was determined. As described in relation to FIG. 7, at 54 the method 50 can further include generating a first control signal 27 causing the at least one image sensor 12 to acquire the second image data at a second frame rate greater than a first frame rate at which the first image data was acquired. In some embodiments, the second image data can be acquired at a second frame rate of 1 frame every 2-3 seconds. Additional or alternate second frame rates can be envisioned. Returning to FIG. 6A, at 45, the method 40 can include determining one or more second segmentation frames 14 in the second image data. The one or more second segmentation frames 14 can correspond to the portions of the area 13 included in the one or more first segmentation frames 14. Segmentation frames of the second image data can be determined in a similar manner as the one or more first segmentation frames 14 were determined at 42 of method 40. The frame rate of the second image data can be faster than the frame rate of the first image data to provide more accurate detection of the hazard event 17. The field of view of the second image can be magnified compared to the first image data to further improve the accuracy of the detected location at which the hazard event 17 is present within the area 13.

At 46, the method 40 can include determining a persisted state of the hazard event within the at least one portion of the area characterized by the magnified field of view based on at least one second pixel in at least one second segmentation frame exceeding the temperature threshold value associated with the at least one pixel in the at least one first segmentation frame for a predetermined period. For example, the persisted state of the hazard event can be determined based on comparing temperature values of pixels in the at least one second segmentation frame 14 of the second image data to temperature threshold values of pixels in the at least one first segmentation frame 14 of the first image data for the predetermined period. In some embodiments, the predetermined period can be configured by a user or can be a setting of the HDMS 18. The predetermined period can act as a temporal threshold, which in use with the temperature threshold values comparison to temperature values in the second image data can reinforce determination of the persistent state of the hazard event 17.

As shown in FIG. 6B, at 47, responsive to determining the persisted state of the hazard event 17, one or more controls signals 27 controlling operation of the dispenser 6 can be generated. For example, responsive to determining the persisted state of the hazard event 17, the HDMS 18 can generate control signals 27 causing one or more dispensers 6 in the dispensing environment 7 to cease dispensing operations. In some embodiments, the control signals 27 can cause at least one dispenser 6 to be locked from further dispensing or reduce a rate of fuel supplied via the dispenser 6. In some embodiments, the control signals 27 can cause activation of a fire suppression system 11 configured within the dispensing environment 7. In some embodiments, the control signals 27 can control further operations of the image sensor 12, such pan, zoom, tilt, or the like. In some embodiments, the control signals 27 can be generated responsive to determining the initial state of the hazard event 17. In some embodiments, the control signals 27 can be configured to cause one or more of the dispensers 6 to cease fueling immediately. In some embodiments, the control signals 27 can be configured to cause one or more dispenser pumps to cease operation. In some embodiments, the control signals 27 can be configured to provide a message in a display of the dispenser 6. At 48, the one or more generated control signals 27 can be provided to receiving entities, such as the image sensor 12, the dispenser 6, the fire suppression system 11, or other computing devices configured within the system 5.

In some embodiments, in addition to generating one or more control signals, the HDMS 18 can also generate a notification or alert 28 associated with the hazard event 17 responsive to determining the persisted state of the hazard event 17. For example, the notifications or alerts 28 can be provided to emergency services personnel 10 and/or to a computing device associated with an operator or attendee of the dispensing environment 7, such as O/A device 4 shown in FIG. 1. In some embodiments, the notification, or alerts 28 can be generated responsive to determining the initial state of the hazard event 17. In some embodiments, the alerts 28 can be provided to operators, owners, or employees of the dispensing environment 7 via email, phone, or text messaging.

Figure 8:
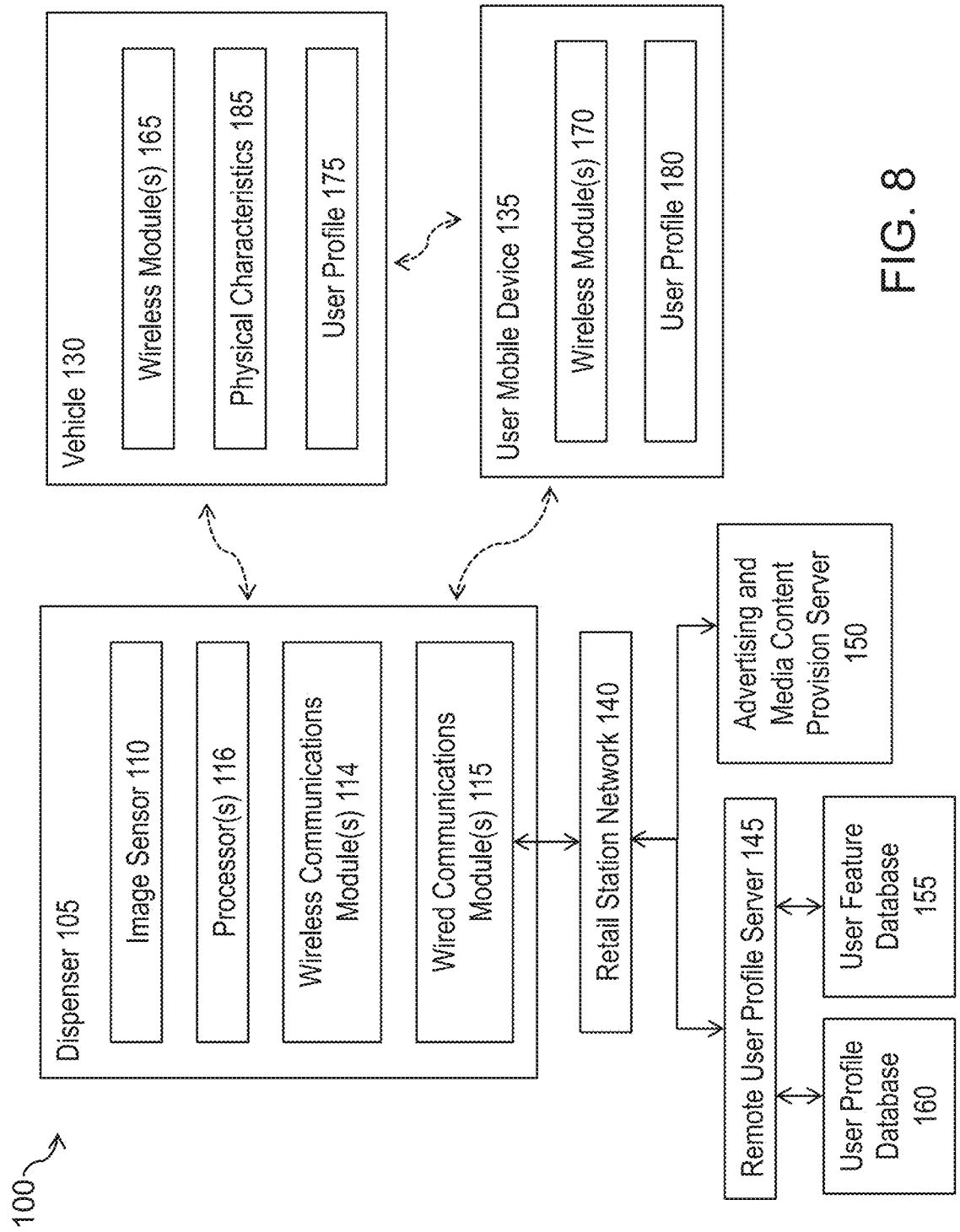
FIG. 8 is a system block diagram illustrating one embodiment of a dispensing system.

FIG. 8 is a system block diagram illustrating one embodiment of a dispensing system 100. The dispensing system 100 can correspond to the portions of the system 5 shown and described in relation to FIG. 1 except where noted otherwise. The dispensing system 100 can be configured within a dispensing environment, which can include a plurality of dispensers 105 arranged about a dispensing environment forecourt, a retail sales facility or operation, and/or a vehicle service or maintenance facility or operation. The dispensing system 100 includes a dispenser 105 capable of exchanging data with a dispenser user, a vehicle, and/or a computing device of the dispenser user. The dispenser 105 can perform operations that include, but are not limited to, receiving inputs related to selecting products available via the dispenser 105, performing dispensing transactions, exchanging loyalty program data with users, displaying graphical and textual content associated with goods and services available within the dispensing environment, and receiving user inputs regarding the available goods and services. Dispensers 105 can correspond to dispenser 6 shown and described in relation to FIGS. 1-2.

Figure 9:
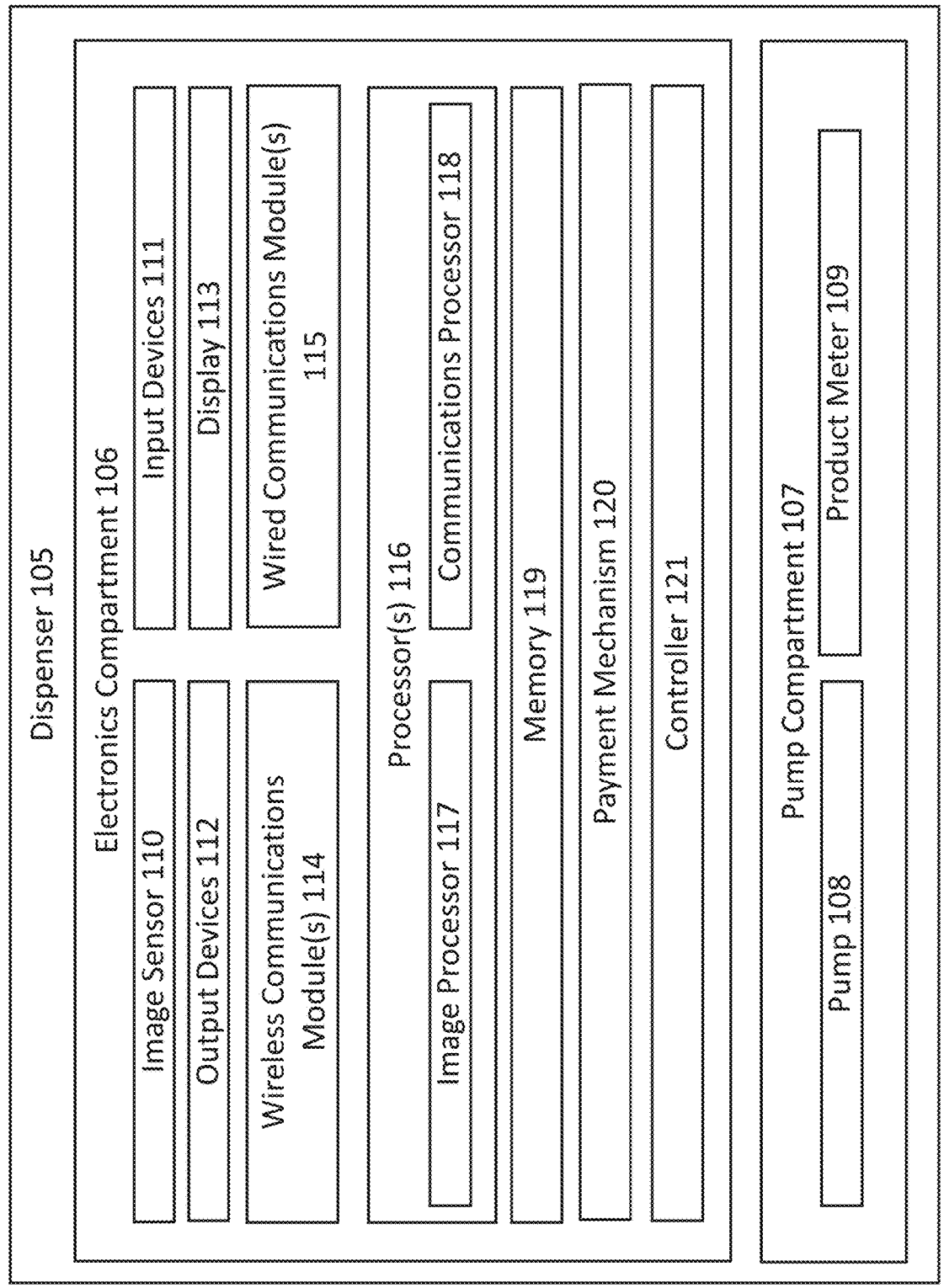
FIG. 9 is a system block diagram of a dispenser in the dispensing system of FIG. 1.

As shown in FIGS. 8 and 9, the dispenser 105 can include an electronics compartment 106 and a pump compartment 107. The electronics compartment 106 can contain therein electronics for facilitating payment for dispensed products, such as fuel, and for facilitating dispensing of the dispensed products. In some embodiments, the electronics can facilitate payment for goods and services available within the dispensing environment, including but not limited to a food item, a beverage, a parking space, a pharmacy item, groceries to be delivered, a car wash, a tire pressure check, public transit, and the like. The electronics compartment 106 can include an image sensor 110, data processor(s) 116, wireless module(s) 114, wired communications module(s) 115, input devices 111, output devices 112 and a memory 119 or similar non-transitory storage medium configured to store computer-readable and executable instructions, which when executed by the processor 116 perform operations of the dispenser 105 described herein. Data processing components of the HDMS 18 described in relation to FIG. 5 can be configured within the electronics compartment 106, such as configured as computer-readable, executable instructions stored in the memory 119, which when executed by one or more of the processors 116, 117, and 118 can perform operations of the methods 40 and 50 described in relation to FIGS. 6A-6B and 7.

The image sensor 110 can include a thermometric camera, an infrared camera, a digital still camera, or a video camera, although other optical sensors are possible. In some embodiments, the image sensor 110 can be affixed to an exterior surface of the dispenser 105. In some embodiments, the image sensor 110 can be configured within the dispensing environment and communicably coupled to the processors 116. The input devices 111 can include an alphanumeric keypad, a numeric keypad, a microphone, or the like. The output devices 112 can include a speaker, a printer, or the like.

The display 113 can be capable of providing information to a user of the dispenser 105. The display 113 can have a variety of configurations, such as a cathode ray tube (CRT) screen, a liquid crystal display (LCD) screen, a light emitting diode (LED) screen, a touchscreen, and the like. For example, the display 113 can include a single display. Alternatively, the display 113 can include multiple displays. For example, a first display 113 can be on a front side of the dispenser 105 and a second display 113 can be on a back side of the dispenser 105. As another example, the display 113 can include two displays mounted next to each other to increase an overall display size. As yet another example, the display 113 can include first and second displays mounted next to each other on a front side of the dispenser 105 and can include third and fourth mounted next to each other on a back side of the dispenser 105.

The communications modules, such as either of the wireless communications module(s) 114 or the wired communications module(s) 115 are capable of exchanging data between the dispenser 105 and computing devices communicably coupled to the dispenser 105. For example, in some embodiments, the wireless communication module(s) 114 can be capable of communicating or exchanging data wirelessly with a remote system (e.g., a remote cloud server, a third-party payment authorization system, etc.) utilizing a variety of communication protocols, e.g., TCP/IP, etc. In some implementations, the wireless communication module(s) 114 can be capable of facilitating wireless communication over a short-range communication link. For example, the wireless communication module(s) 114 can include a transceiver configured to communicate via any of a variety of short-range wireless techniques, such as a Bluetooth protocol, a Wi-Fi protocol, near field communication (NFC), an ultra-wideband (UWB) protocol, a radio frequency identification (RFID) protocol, etc. Any of a variety of types of wireless connectivity hardware can be used for the short-range wireless connectivity, as will be appreciated by a person skilled in the art. The types of wireless connectivity that the wireless communication module(s) 114 includes can be chosen by an owner of the dispensing system 100 according to the owner's current dispensing site setup and/or future dispensing environment plans, and the wireless communication module(s) 114 may be manufactured and/or updated accordingly.

In some embodiments, the wireless module(s) 114 can operatively connect the dispenser 105 with a vehicle 130 and a computing device 135, which in this embodiment is a user mobile device 135, as shown in FIG. 9. The wireless module 114 can include, e.g., a transceiver communicating via Bluetooth protocol, cellular protocol, WIFI protocol, near field communication (NFC), and/or a radio frequency identification (RFID) protocol. The wired communications module 115 operatively connects the dispenser 105 with a remote user profile server 145 and an advertising and media content provision server 150 via a retail station network 140. The retail station network 140 can connect multiple dispensers 105 together over a local area network (LAN).

In some embodiments, the wired communication module(s) 115 can be configured to communicate or exchange data over a wired connection in addition to or instead of over a wireless connection. A wired connection can be used, for example, for a local communication link between the dispenser 105 and a local computing system external to the dispenser 105 (e.g., a forecourt controller, an in-store a point of sale (POS) device, etc.). A wired connection may provide more security and/or stability than a wireless connection and/or may allow a legacy dispenser 105 configured to communicate only via one or more wired connections to implement dynamic management of content provided via the display 113. Wired communication can occur via any of a variety of wired communication protocols, e.g., TCP/IP, etc., as will be appreciated by a person skilled in the art. Some dispensers 105 are manufactured with two-wire connectivity, and the wired communication can accordingly be via two wires, such as via a controller area network bus (CAN Bus) two wire connection, an RS485 two wire connection, a current loop connection, or other type of two wire connection. Some dispensers 105 are additionally or alternatively manufactured with cable connectivity and can accordingly be configured to provide wired communication via cable connection, such as an Ethernet cable or other network cable. Older dispensers 105 typically have two-wire connectivity capabilities while newer dispensers 105 typically have Ethernet connectivity capabilities instead.

The processor(s) 116 can include one or more processors forming part of at least one computing system. In one embodiment, the processor(s) 116 include at least an image processor 117 and a communications processor 118 as shown in FIG. 9. An image processor can receive one or more images from the image sensor 110 and determine identity information of a customer using the images. Identity information can include, for example, facial feature of a customer, a vehicle feature, a license plate number, a non-facial body feature, and the like. The image processor 117 can receive an image from image sensor 110, for example, when the dispenser 105 detects that a customer or user is proximate to the dispenser 105 and/or is in the field of view of the image sensor 110. The image can be of the customer (e.g., can contain a visual representation of the customer) and/or the customer's vehicle, for example. The image processor 117 is capable of performing operations, including but not limited to, receiving image data, and identifying physical characteristics of the user or a vehicle to determine regions within the image data in which the customer's face, body, and vehicle reside.

Using these regions, one or more image features related to the customer's face, body, and vehicle. For example, a facial feature can include skin texture; relative position, size, and/or shape of the eyes, nose, cheekbones, and jaw; and the like. Body features can include height, weight, hair color, body shape, and the like. Vehicle features can include shape, color, license plate number, manufacturer/make/model decal, and the like.

In at least some implementations, the image processor 117 is capable of classifying aspects of the image data as a vehicle, a non-facial body part, and/or a safety object or event. For example, the image processor 117 can classify (or determine) characteristics of the customer's vehicle based on the vehicle features. These characteristics can include, for example, license plate number, vehicle make, required grade and/or type of fuel for the vehicle, and vehicle model.

The image processor 117 is also capable of classifying (or determining) characteristics of the customer that do not directly derive the customer's identity based on the non-facial body features. For example, the image processor 117 is capable of determining a customer's height, weight age, gender, disability status (e.g., in a wheelchair or not in a wheelchair, etc.), and the like.

The image processor 117 is further capable of classifying (or determining) behavior of the customer that relates to safety and is based on an extracted feature present within the image data. For example, the image processor 117 can determine whether the customer is smoking, whether the customer is grounded prior to dispensing products or fuel, whether the vehicle engine is running during fueling, and whether the customer is about to "drive-off" (which can include leaving the fuel retailer without paying for dispensed products or fuel). Other determinations can include environmental, mechanical, electrical, and/or logical instruction conditions, such as, for example, temperature, pressure, humidity, fuel leaks, open panels, dispenser intrusion, power irregularities, watchdog timer expiration, and software exceptions.

Based on these classifications, the image processor 117 is capable of generating an alarm. The alarm can include a warning (e.g., signal, audio, light, and the like) to an attendant of the dispensing environment, such as at a site of the dispenser 105. The warning can include an audible sound emanating from the dispenser 105, a visual or graphical warning on the display 113 of the dispenser 105 indicating that products cannot be dispensed until the detected problem is corrected, and the like. Generating the alarm can include causing a corrective action to be performed, for example, restarting the dispenser 105 (e.g., in the event that a mechanical, electrical, and/or logical problem with the dispenser 105 is detected by the image processor 117), shutting down the dispenser 105 (e.g., in the event that an unsafe condition is detected by the image processor 117, such as the customer smoking before or during fueling, the customer not being grounded prior to dispensing fuel or products, the vehicle engine running during fueling, or a mechanical, electrical, and/or logical problem with the dispenser 105 being detected that cannot be fixed without manual intervention), downloading instructions for the dispenser 105 (e.g., to correct a mechanical, electrical, and/or logical problem with the dispenser 105), and/or generating notifications for other components at the fueling facility that includes the dispenser 105 (e.g., in the event an unsafe condition is detected by the image processor 117 that may affect safe functioning one or more other dispensers 105 within the dispensing environment).

In at least some implementations, image data including the facial features of a user or customer can be conveyed via the dispenser's communications module(s), such as the wireless module(s) 114 and/or the wired communications module(s) 115 to a remote user profile server 145, as described more fully below.

Referring again to FIG. 8, the dispenser 105 can transmit image data including facial features of a user or customer to a remote user profile server 145 in order to match the customer with a known customer identity. The remote user profile server 145 can receive the facial features and access a database 155 (which may include one or more databases) containing known customer features. The database 155 can contain features of customers that have previously visited the dispenser 105 or that have previously enrolled in a customer rewards program associated with the facility providing the dispenser 105 and provided an image of their face in association with the program. The database 155 can also associate unique identities (e.g., names or unique identifiers) with known facial features, e.g., in a table. The remote user profile server 145 can compare the received facial features with the features in the database 155 to find a match. If and once a match is found, the remote user profile server 145 can use the associated customer identifier to query a user profile database 160. The user profile database 160 can contain user profiles for each known customer in the feature database 155 (which may include one or more databases). User profiles can include preferences related to dispensed products (e.g., a preferred product grade, a product type, a payment method, a loyalty rewards identifier, whether to apply loyalty rewards to a present purchase, whether to purchase a car wash, and the like). The user profile and/or identity can be transmitted from the remote user profile server 145 to the dispenser 105.

The user profile and/or identity may be received by the communications processor 118 and can be stored in the memory 119. The user profile can be used by the communications processor 118 to provide a customized product dispensing experience. For example, the user profile can be accessed and the dispenser 105 can be configured with the customer's preferences. This can include rendering, on the display 113, a preference selection screen populated with the customer's dispensing preferences as specified in the user profile. In at least some implementations, the dispenser 105 can render a personalized greeting on the display 113.

In at least some implementations, identity information can be received by the communications processor 118. The identity information can include a name or unique identifier of the customer. This identity information can be used by the communications processor 118 to acquire the user profile from the remote user profile server 145. In at least some implementations the identity information can include, for example, facial features of the customer, vehicle features, license plate number, non-facial body features, and the like.

In at least some implementations, the user identity can be provided to an advertising and media content provision server 150, which can provide customized or targeted advertisements and content to the dispenser 105 for provision to the customer during dispensing of products, e.g., by displaying the advertisements and content on the display 113. For example, once the user identity is determined, advertisements can be dynamically determined and provided.

The advertisements can be pre-specified by remote merchants. Remote merchants can be any appropriate sellers of goods and/or services. For example, a merchant may sell durable goods (e.g., vehicle parts, toys, etc.), perishable goods (e.g., food, drink, etc.), intangible goods (e.g., software, digital media, etc.), or services (e.g., oil changes, car washes, etc.). Remote merchants can include any appropriate computer systems (e.g., servers and databases) for allowing them to send data regarding their goods and/or services over a communication network to fuel dispensers. Remote merchants can operate proactively, interactively, and/or or passively with fuel dispensers to market and/or sell their goods and/or services. For example, the remote merchants can download merchandising content (advertisements and pricing data) to the dispensers 105 at designated times or events, or the remote merchants can download merchandising content to the dispensers 105 upon request. In at least some implementations, the remote merchants can maintain a Web-based portal through which the dispensers 105 can download the content. As discussed herein, remote merchants are remote in the sense that they are not located at the dispensing environment that includes the dispensers 105 to which the remote merchants provide advertisements and/or other content. Thus, the remote merchants can be located in the neighborhood of the dispensing environment. One or more the merchants, of course, could be located at greater distances (e.g., across the state or country) from the dispensing environment.

Dynamic advertisements can include a listing of goods and/or services, along with descriptions and pricing information. The advertisements can include text, graphics, audio, and/or video for presentation at the dispenser 105.

Using the user profile and/or user identity information, the dispensers 105 can determine when to present the above-described merchant-provided data. For example, a dispenser 105 may present the data (e.g., on a display thereof) at certain points of a product dispensing session (e.g., while a product or a fuel is being dispensed or after dispensing the product or fuel is complete). The dispenser 105 can then determine whether the customer indicates interest in the merchant data (e.g., by detecting user input regarding the presented data). If the dispenser 105 detects user interest in the merchant-provided data, the dispenser 105 can present additional information regarding the goods and/or services and determine whether the customer desires to order a good and/or service. Additional information regarding goods or services can include textual descriptions, images, audio, and/or video.

If a customer desires to order a good and/or service, the dispenser 105 can acquire order data (e.g., quantity, price, and delivery information) or the order data can be included or inferred from the customer's user profile. The dispenser 105 can also acquire payment data or payment data may be included or inferred from the user profile. The dispenser 105 can also evaluate whether the payment data is sufficiently complete. If the payment data is acceptable, the dispenser 105 can then generate a message for the appropriate remote merchant regarding the order and payment information and generate a receipt for the customer. The appropriate merchant can then make arrangement for delivery of the good and/or service.

To facilitate customer interaction in at least some embodiments, the user profile can include customer-related data. The customer-related data can, for example, be associated with a customer identifier (e.g., a credit card number, a personal identification number (PIN), a telephone number, a radio frequency identifier (RFID) number, or a loyalty program number). The customer-related data can be information regarding a product dispensing session (e.g., a type of product or fuel, a display language for the dispenser display, audio settings for the dispenser, or payment preferences (e.g., certain credit card, certain debit card, cash to be paid at a staffed payment terminal, etc.)), data regarding services at the dispensing environment (e.g., car wash, air pump, or water hose), or data regarding the customer (e.g., address and preferred payment types). In at least some implementations, the customer-related data can be used to identify other information that may be of interest to the customer. For example, particular types of merchandise (e.g., drinks, newspapers, or food) or offers (e.g., coupons or advertising) can be presented to the customer based on customer-related data. This presentation can, for example, be based on the customer's past purchasing habits in a fueling facility store. The customer-related data can be acquired from the user profile and/or from a remote server using the customer identity.

In at least some implementations, the dispenser 105 can receive the user profile directly from a vehicle 130 (e.g., the customer's vehicle) and/or the mobile device 135. Each of the vehicle 130 and the mobile device 135 can include wireless module(s) 165, 170 (respectively) in communication with one another and with the wireless module(s) 114 of the dispenser 105. Communications between the vehicle 130 and the dispenser 105 can use an on-board diagnostics (OBD) mechanism of the vehicle 130, e.g., OBDII technology in which the vehicle 130 includes an OBDII port (cars manufactured after 1996 have an OBDII port). A copy of the user profile 180 can be contained on the customer's vehicle (for example, a smart vehicle having at least one data processor forming part of at least one computing system with the user profile stored in a memory of the at least one computing system) and/or a copy of the user profile 175 can be contained on the customer's mobile device 135 (e.g., in a memory thereof). When the dispenser 105 detects that the customer is proximate thereto (for example, via the image sensor 110 and/or the wireless module(s) 114), the wireless module(s) 114 can initiate a communication session with the vehicle 130 and/or the mobile device 135 and retrieve the customer's user profile. Once the user profile is received directly from the vehicle 130 or the mobile device 135, the customized dispensing experience can be provided as described above.

Returning to FIG. 9, the electronics compartment 106 can also include a payment mechanism 120 (e.g., a card reader, a Near Field Communication (NFC) module, etc.) configured to facilitate payment for dispensed products, such as fuel, (or other goods and services). The payment mechanism 120 can be configured to receive inputs such as, e.g., user identification information and/or payment information, and deliver the information to the controller 121. For example, the payment mechanism 120 can include a barcode and/or QR code scanner, and/or an NFC contactless card reader for receiving payment information, user identification information, vehicle information, and/or loyalty program information.

The electronics compartment 106 can also include a controller 121 configured to receive instructions from the processor(s) 116 and generate one or more control signals controlling operations of components of the dispenser 105 in accordance with the operations described herein. In some embodiments, the controller 121 can include a data processor and a memory storing computer-readable and executable instructions, forming part of at least one computing system within the electronics compartment 106. In some embodiments, controller 121 can be operably coupled to components of the electronics compartment 106, such as the display 113, the image sensor 110, the wireless communication module(s) 114, the wired communication module(s) 115, the processor(s) 116, the memory 119, and the payment mechanism 120, and the controller 121 can be configured to control operations thereof. In some embodiments, the controller 121 can be configured as a fuel controller and can be operatively coupled to components of the pump compartment 107, such as the pump 108 or the product meter 109. The fuel controller 121 can generate control signals controlling operations of the pump 108 or the product meter 109.

The pump compartment 107 houses a pump 108 configured to provide a liquid dispensed product, such as fuel, from a storage tank or other reservoir. The pump compartment 107 can also include one or more product meters 109 that can be configured to monitor flow of dispensed products, flow of additives added to the dispensed product, and/or flow of other components of the dispensed product fuel. The pump compartment 107 can also include other components to facilitate product dispensing and mixing, such as motors and valves, a strainer/filtering system, a vapor recovery system, and the like. The pump compartment 107 is isolated from the electronics compartment 106 within the dispenser 105 to facilitate safety, security, and/or maintenance, as will be appreciated by a person skilled in the art. Dispensed products do not flow or are not conveyed from the pump compartment 107 to the electronics compartment 106 and instead the dispensed products, such as fuel, flow or otherwise are conveyed through the pump compartment 107 to a dispensing device of the dispenser 105, such as a hose and a nozzle at an end of the hose. The dispenser 105 can include any number of hoses and associated nozzles.

A person skilled in the art will appreciate that the dispenser 105 can have various other configurations. Various exemplary implementations of dispensers and methods of provisioning software thereto are described further in, for example, U.S. Pat. No. 10,214,411 entitled "Fuel Dispenser Communication" issued Feb. 26, 2019; U.S. Pat. No. 10,269,082 entitled "Intelligent Fuel Dispensers" issued Apr. 23, 2019; U.S. Pat. No. 10,577,237 entitled "Methods And Devices For Fuel Dispenser Electronic Communication" issued Mar. 3, 2020; U.S. Pat. No. 10,726,508 entitled "Intelligent Fuel Dispensers" issued Jul. 28, 2020; U.S. Pat. No. 11,276,051 entitled "Systems And Methods For Convenient And Secure Mobile Transactions" issued Mar. 15, 2022; U.S. Pat. No. 11,429,945 entitled "Outdoor Payment Terminals" issued Aug. 30, 2022; U.S. Pat. No. 11,443,582 entitled "Virtual Payment System and Method for Dispensing Fuel" issued Sep. 13, 2022; U.S. Pat. App. Pub. No. 2023/0196360 entitled "Conducting Fuel Dispensing Transactions" published Jun. 22, 2023, and U.S. Pat. App. Pub. No. 2023/0103400 entitled "Intelligent Electronic Fueling Station Component Provisioning" published Apr. 6, 2023, each of which are hereby incorporated by reference in their entireties.

Figure 10:
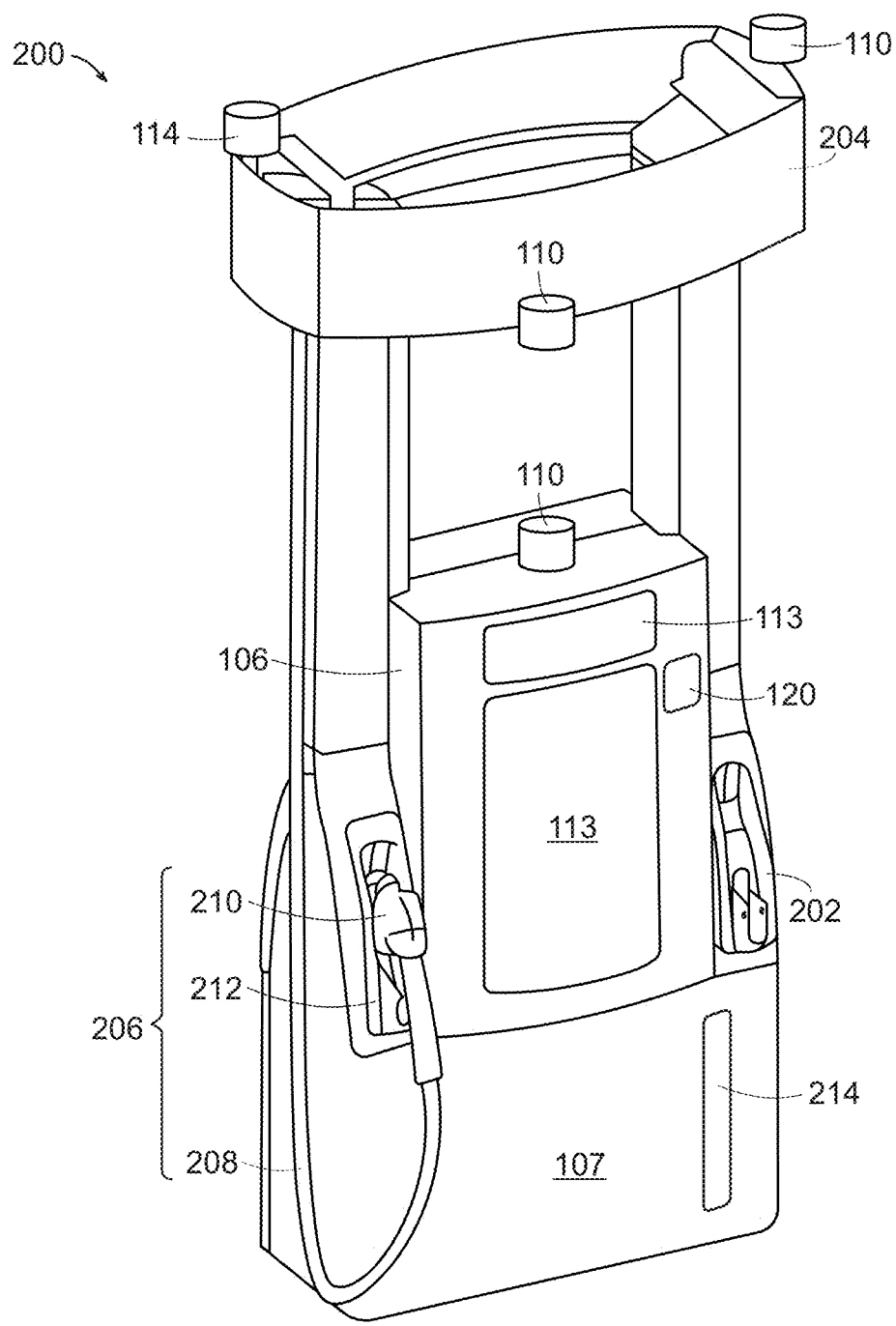
FIG. 10 is a diagram illustrating a perspective view of an embodiment of the dispenser of FIGS. 8 and 9 configured to dispense a liquid product.

FIG. 10 illustrates a perspective view of one embodiment of a dispenser 200. The dispenser 200 is an embodiment of dispenser 105 of FIGS. 8 and 9. The dispenser 200 can be configured to dispense liquid products (e.g., petroleum fuel). For example, in some embodiments, the dispenser 200 can be configured to dispense liquid products such as gasoline, diesel fuel, ethanol-based fuels, biofuels, diesel exhaust fluid (DEF), fuel additives (e.g., acetone, ether, nitrous oxide, nitromethane, butyl rubber, ferox, oxyhydrogen), water and the like.

As shown in FIG. 10, the dispenser 200 can include a dispenser body 202 in which the electronics compartment 106 and the pump compartment 107 are configured. The dispenser 200 can also include a dispenser awning 204 coupled to the dispenser body 202. In some embodiments, the dispenser body 202 can include the dispenser awning 204. In some embodiments, the dispenser body 202 can exclude the dispenser awning 204. The dispenser awning 204 can include at least one image sensor 110 and at least one wireless transmission module 114 configured thereon. In some embodiments, the dispenser body 202 can, additionally or alternatively, include an image sensor 110. As further shown, the dispenser body 202 can include a display 113, a payment mechanism 120, and a dispensing assembly 206.

The dispenser body 202 can include an electronics compartment 106 and a pump compartment 107. The pump compartment 107 is isolated from the electronics compartment 106 within the dispenser 105 to facilitate safety, security, and/or maintenance, as will be appreciated by a person skilled in the art. Dispensed products or fuel is thus not allowed to flow from the pump compartment 107 to the electronics compartment 106 and instead flows from the pump compartment 107 to the dispensing assembly 206. The dispensing assembly 206 can include a hose 208 coupled to a nozzle 210 for dispensing the liquid product. As will be appreciated by a person skilled in the art, the nozzle 210 can be configured to dispense the liquid product from the dispenser 105 as pumped therefrom by the pump 108. The dispensing assembly 206 can also include a nozzle receptacle 212 configured to store the nozzle 210 when not in use. In some embodiments, the dispenser 200 can include 1, 2, 3, 4, 5, or 6 dispensing assemblies 206. In some embodiments, one or more first dispensing assemblies 206 can be provided on a first side of the dispenser 200 and one or more second dispensing assemblies 206 can be provided on a second side of the dispenser 200 that is opposite the first side of the dispenser 200.

In some embodiments, the dispenser 200 can be configured to dispense diesel exhaust fluid (DEF) and can include a heater 214 within the pump compartment 107 of the dispenser body 202. The heater 214 can be configured to heat the DEF and portions of the pump compartment 107 and/or dispensing assemblies 206. Heating components of the dispenser 200 can be advantageous in climates where freezing temperatures are a concern.

In some implementations, the dispensers described herein can be configured to other types of dispensed products, in addition to or instead of a liquid dispensed product. For example, the dispenser can be configured to dispense products in a gaseous format, such as hydrogen, compressed natural gas (CNG), liquified natural gas (LNG), electricity, or the like. It will be understood that the dispensing environments, dispensing systems, and the dispensers described herein are not limited to dispensing products in liquid format and that the dispensing environments, dispensing systems, and the dispensers described herein can, additionally or alternatively, be configured to dispense products in non-liquid product formats, such as a vapor, a gas, or electricity. For example, in some implementations, the dispenser 200 can be a hydrogen dispenser. As another example, in some implementations, the dispenser 200 can be a compressed natural gas dispenser. As yet another example, in some implementations, the dispenser 200 can be an electrical fuel dispenser configured to dispense electricity.

Figure 11:
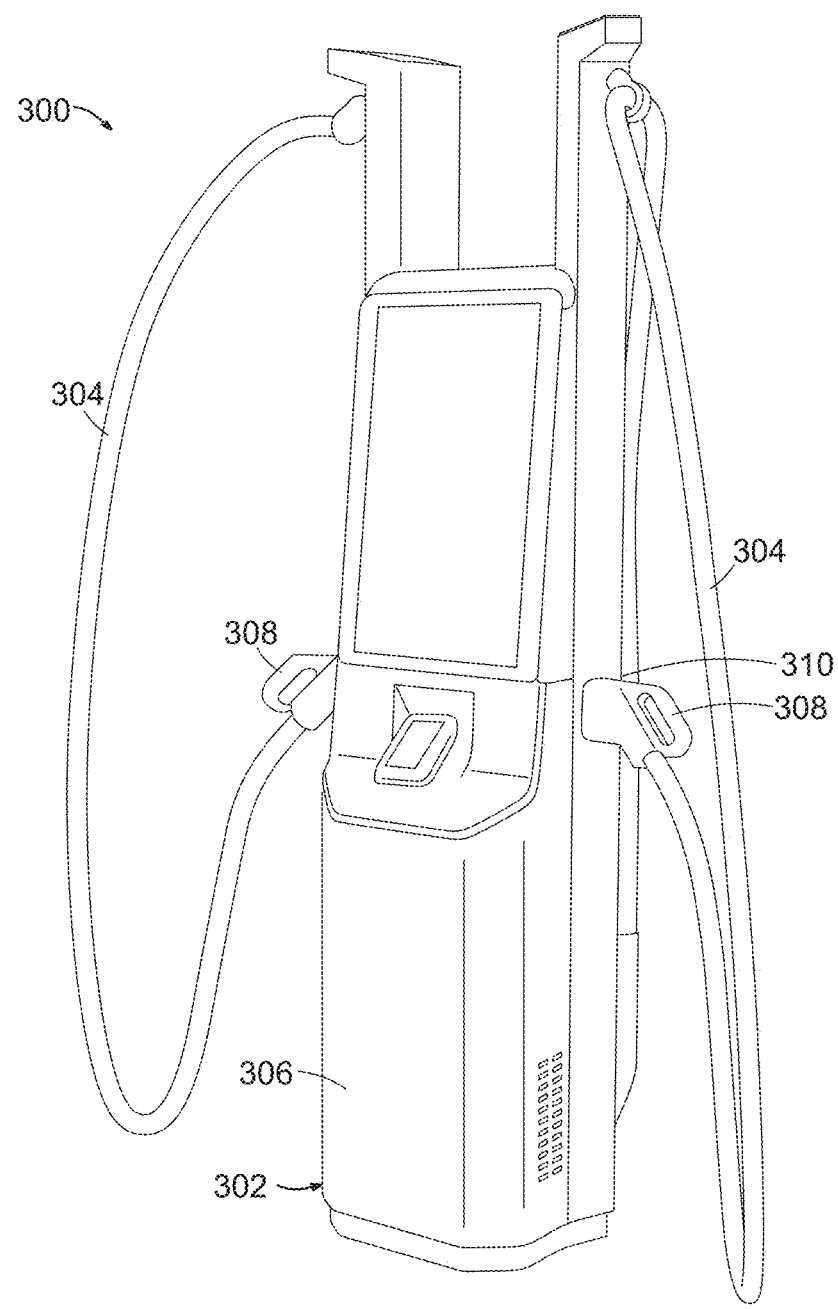
FIG. 11 is a side perspective view of an embodiment of a dispenser configured to dispense electricity.

The dispenser 300 of FIG. 11 is another embodiment of the dispenser 105 and 200 of FIGS. 8-10 except where noted otherwise. The dispenser 300 can be configured to dispense electricity. For example, the dispenser 300 can be configured as an electric vehicle charger. The dispenser 300 can be operatively coupled to a power supply 302, such as a local or regional power grid, a battery-back up power supply, a retail sales facility, or a vehicle service facility located in proximity of the dispenser 300.

The dispenser 300 can include a charging cable 304 coupled to a dispenser body 306 of the dispenser 300. In some embodiments, the dispenser 300 can include multiple charging cables 304 as shown in FIG. 11 and is not limited to a configuration having a single charging cable 304. The charging cable 304 can be configured to deliver electricity to a charging connector 308. The charging connector 308 can be configured to couple to a charging port of a vehicle and to deliver the electricity provided by the dispenser 300, via the charging cable 304, to the vehicle when the charging connector 308 is coupled to the vehicle charging port. When not in use, the charging connector 308 is configured to be stored in a charger receptacle 310 formed on the dispenser body 306.

Figure 12:
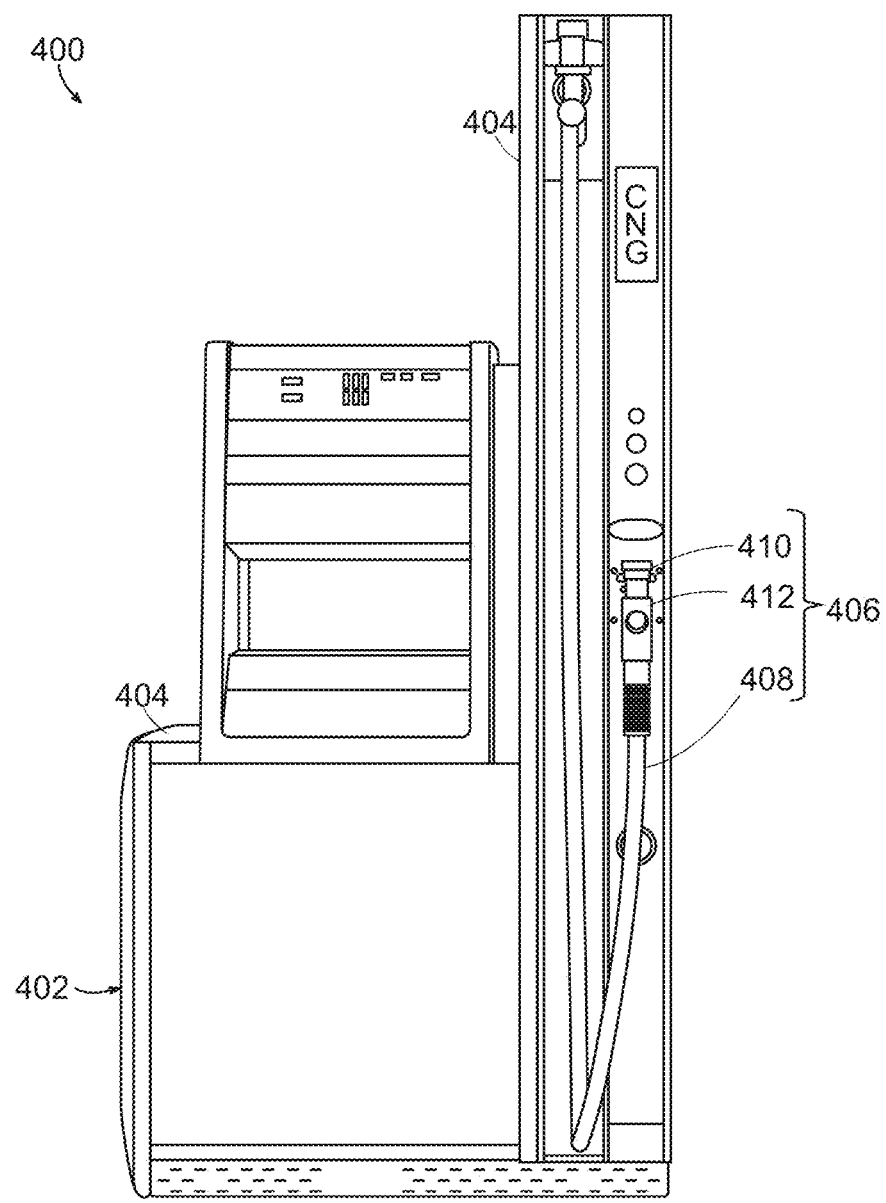
FIG. 12 is a front perspective view of an embodiment of a dispenser configured to dispense a gaseous product.

The dispenser 400 shown in FIG. 12 is another embodiment of the dispenser 105 and 200 of FIGS. 8-10 except where noted otherwise. The dispenser 400 can be configured to dispense gaseous products such as compressed natural gas (CNG). In some embodiments, the dispenser 400 can alternatively be configured to dispense, liquified petroleum gas (LPG), hydrogen, and liquified natural gas (LNG). For example, the dispenser 400 can be operatively coupled to a gas supply 402 of CNG or other gaseous product, such as a local or regional pipeline, a stored gas supply located within the dispensing environment with the dispenser 400, or a mobile tube trailer in proximity of the dispenser 400.

The dispenser 400 can also include one or more dispensing assemblies 406 configured within the dispenser body 404. The dispensing assembly 406 can include a hose 408 coupled to a nozzle 410 for dispensing the gaseous CNG product. As will be appreciated by a person skilled in the art, the nozzle 410 can be configured to dispense the CNG product from the dispenser 400. The dispensing assembly 406 can also include a nozzle receptacle 412 configured to store the nozzle 410 when not in use. In some embodiments, the dispenser 400 can include 1, 2, 3, 4, 5, or 6 dispensing assemblies 406. In some embodiments, one or more first dispensing assemblies 406 can be provided on a first side of the dispenser 400 and one or more second dispensing assemblies 406 can be provided on a second side of the dispenser 400 that is opposite the first side of the dispenser 400.

In some embodiments, the dispensers described herein can be configured to dispense multiple product types. For example, a first portion of a dispenser including a first dispensing assembly can be configured to dispense a liquid product, such as petroleum or DEF, and a second portion of the same dispenser can include a second dispensing assembly configured to dispense a non-liquid product, such as electricity or a gaseous product, such as CNG, LNG, LPG, or Hydrogen. A variety of combinations of dispensing portions and assemblies necessary to dispense multiple, different dispensed products can be envisioned within a single dispenser body of a dispenser as described herein.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

One skilled in the art will appreciate further features and advantages of the devices, systems, and methods based on the above-described embodiments. Accordingly, this disclosure is not to be limited by what has been particularly shown and described, except as indicated by the appended claims. All publications and references cited herein are expressly incorporated herein by reference in their entirety for all purposes.

Those skilled in the art will understand that the systems, devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The present disclosure has been described above by way of example only within the context of the overall disclosure provided herein. It will be appreciated that modifications within the spirit and scope of the claims may be made without departing from the overall scope of the present disclosure.

What is claimed is:

1. A method comprising:
   receiving first image data characterizing an area within a dispensing environment comprising a dispenser, the first image data acquired via at least one image sensor configured within the dispensing environment;
   determining one or more first segmentation frames in the first image data, the one or more first segmentation frames including portions of the area, wherein a number of the one or more first segmentation frames is determined based on a frame dimension metric defining a distance or a length of the area associated with each of the one or more first segmentation frames;
   determining an initial state of a hazard event within at least one portion of the area based on at least one first pixel in at least one first segmentation frame characterizing the at least one portion of the area exceeding a temperature threshold value associated with the at least one first segmentation frame;
   receiving, responsive to determining the initial state of the hazard event, second image data acquired via the at least one image sensor, the second image data characterizing a magnified field of view of the at least one portion of the area;
   determining one or more second segmentation frames in the second image data, the one or more second segmentation frames including the at least one portion of the area;
   determining a persisted state of the hazard event within the at least one portion of the area characterized by the magnified field of view, the persisted state of the hazard determined based on at least one second pixel in the one or more second segmentation frames exceeding the temperature threshold value associated with the at least one pixel in the at least one first segmentation frame for a predetermined amount of time;
   generating, responsive to determining the persisted state of the hazard event, one or more controls signals controlling operation of the dispenser; and
   providing at least one of the generated one or more control signals.

2. The method of claim 1, wherein the at least one image sensor comprises a thermometric camera affixed to the dispenser.

3. The method of claim 2, wherein the thermometric camera is configured to provide a 360-degree field of view of the area within the dispensing environment.

4. The method of claim 1, wherein the hazard event comprises at least one of an electrical spark, heat, smoke, a fire, or a dispenser user smoking in proximity of the area within the dispensing environment.

5. The method of claim 1, further comprising:
   acquiring third image data characterizing an idle condition of the area, the third image data acquired via the at least one image sensor prior to the first image data and the second image data;
   determining one or more third segmentation frames in the third image data, the one or more third segmentation frames characterizing the portions of the area; and
   determining temperature threshold values for pixels in the one or more third segmentation frames,
   wherein the initial state of the hazard event is determined based on comparing temperature values of pixels in the at least one first segmentation frame to temperature threshold values of pixels in at least one third segmentation frame.

6. The method of claim 5, wherein responsive to determining the initial state of the hazard event, the method further comprises:
   generating a first control signal causing the at least one image sensor to acquire the second image data at a second frame rate greater than a first frame rate at which the first image data was acquired,
   wherein the persisted state of the hazard event is determined based on comparing temperature values of pixels in the at least one second segmentation frame of the second image data to temperature threshold values of pixels in the at least one first segmentation frame of the first image data for the predetermined period.

7. The method of claim 1, wherein generating one or more control signals includes generating a second control signal causing one or more dispensers in the dispensing environment to cease dispensing operations and locking at least one dispenser of the one or more dispensers from dispensing.

8. The method of claim 1, wherein generating one or more control signals includes generating a third control signal causing activation of a fire suppression system configured within the dispensing environment to mitigate the hazard event.

9. The method of claim 1, wherein responsive to determining the persisted state of the hazard event, the method further comprises:
generating at least one notification associated with the hazard event; and
providing the at least one notification to emergency services personnel and/or an operator of the dispensing environment.

10. A system comprising:
at least one image sensor configured to acquire image data characterizing an area within the dispensing environment, the at least one image sensor affixed to a dispenser located within the dispensing environment;
a data processor operably coupled to the at least one image sensor; and
a memory operably coupled to the data processor and storing computer-executable instructions, which when executed by the data processor cause the data processor to perform operations comprising:
receiving first image data characterizing the area within the dispensing environment,
determining one or more first segmentation frames in the first image data, the one or more first segmentation frames including portions of the area, wherein a number of the one or more first segmentation frames is determined based on a frame dimension metric defining a distance or a length of the area associated with each of the one or more first segmentation frames,
determining an initial state of a hazard event within at least one portion of the area based on at least one pixel in at least one first segmentation frame characterizing the at least one portion of the area exceeding a temperature threshold value associated with the at least one first segmentation frame,
receiving, responsive to determining the initial state of the hazard event, second image data characterizing a magnified field of view of the at least one portion of the area,
determining one or more second segmentation frames in the second image data, the one or more second segmentation frames including the at least one portions of the area,
determining a persisted state of the hazard event within the at least one portion of the area characterized by the magnified field of view, the persisted state of the hazard determined based on at least one second pixel in the one or more second segmentation frames exceeding the temperature threshold value associated with the at least one pixel in the at least one first segmentation frame for a predetermined amount of time,
generating, responsive to determining the persisted state of the hazard event, one or more controls signals controlling operation of the dispenser, and
providing at least one of the generated one or more control signals.

11. The system of claim 10, wherein the at least one image sensor comprises a thermometric camera.

12. The system of claim 11, wherein the thermometric camera is configured to provide a 360-degree field of view of the area within the dispensing environment.

13. The system of claim 10, wherein the hazard event comprises at least one of an electrical spark, heat, smoke, a fire, or a dispenser user smoking in proximity of the area within the dispensing environment.

14. The system of claim 10, wherein the second image data is acquired at a second frame rate via the at least one image sensor after determining the initial state of the hazard event, the second frame rate greater than the first frame rate.

15. The system of claim 10, wherein the operations further comprise:
acquiring third image data characterizing an idle condition of the area, the third image data acquired prior to the first image data and the second image data,
determining one or more third segmentation frames in the third image data, the one or more third segmentation frames characterizing the portions of the area, and
determining temperature threshold values for pixels in the one or more third segmentation frames,
wherein the initial state of the hazard event is determined based on comparing temperature values of pixels in the at least one first segmentation frame to temperature threshold values of pixels in at least one third segmentation frame.

16. The system of claim 15, wherein responsive to determining the initial state of the hazard event, the operations further comprise:
generating a first control signal causing the at least one image sensor to acquire the second image data at a second frame rate greater than a first frame rate at which the first image data was acquired,
wherein the persisted state of the hazard event is determined based on comparing temperature values of pixels in the at least one second segmentation frame of the second image data to temperature threshold values of pixels in the at least one first segmentation frame of the first image data for the predetermined period.

17. The system of claim 10, wherein generating the one or more control signals includes generating a second control signal causing one or more dispensers in the dispensing environment to cease dispensing operations and locking at least one dispenser of the one or more dispensers from dispensing.

18. The system of claim 10, wherein generating the one or more control signals includes generating a third control signal causing activation of a fire suppression system configured within the dispensing environment to mitigate the hazard event.

19. The system of claim 10, wherein responsive to determining the persisted state of the hazard event, the operations further comprise:
generating at least one notification associated with the hazard event, and
providing the at least one notification to emergency services personnel and/or an operator of the dispensing environment.

20. The system of claim 10, wherein the operations further comprise:
storing the first image data and the second image data in the memory, and
providing the first image data and the second image data as an input to a causal analysis audit of the hazard event within the dispensing environment.

* * * * *